(12) United States Patent
Yoshida

(10) Patent No.: US 11,386,538 B2
(45) Date of Patent: Jul. 12, 2022

(54) IMAGE PROCESSING APPARATUS, IMAGE PROCESSING METHOD, AND STORAGE MEDIUM

(71) Applicant: NEC Corporation, Tokyo (JP)

(72) Inventor: Shinichiro Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 16/965,081

(22) PCT Filed: Jan. 21, 2019

(86) PCT No.: PCT/JP2019/001616
§ 371 (c)(1),
(2) Date: Jul. 27, 2020

(87) PCT Pub. No.: WO2019/146538
PCT Pub. Date: Aug. 1, 2019

(65) Prior Publication Data
US 2021/0118118 A1    Apr. 22, 2021

(30) Foreign Application Priority Data

Jan. 29, 2018 (JP) .............................. JP2018-012307

(51) Int. Cl.
*G06T 7/00* (2017.01)
*G06N 20/20* (2019.01)

(52) U.S. Cl.
CPC ........... *G06T 7/0002* (2013.01); *G06N 20/20* (2019.01); *G06T 7/97* (2017.01); *G06T 2207/20081* (2013.01); *G06T 2207/20224* (2013.01)

(58) Field of Classification Search
CPC ..................... G06T 7/0002; G06T 7/97; G06T 2207/20081; G06T 2207/20224; G06T 7/001; G06T 2207/20084; G06N 20/20
See application file for complete search history.

(56) References Cited

U.S. PATENT DOCUMENTS 7,640,530 B2 * 12/2009 Ando ...................... G06T 7/001
716/51
2001/0048758 A1 * 12/2001 Oosawa ............... G06K 9/6203
382/132
(Continued)

FOREIGN PATENT DOCUMENTS

JP    H11-132959 A    5/1999
JP    2006-105777 A    4/2006
(Continued)

OTHER PUBLICATIONS

Osawa, S., "Image Determination Device, Image Determination Method, and Program Therefor", English Translation of JP2006325937A, published Dec. 7, 2006.*
(Continued)

*Primary Examiner* — Xuemei G Chen
(74) *Attorney, Agent, or Firm* — Sughrue Mion, PLLC

(57) ABSTRACT

Provided are an image processing apparatus, an image processing method, and a storage medium that can determine an anomaly while reducing influence of an individual difference of images. The image processing apparatus includes: a first generation unit that generates a first estimation image including at least a predetermined region of an inspection target by using a part of an inspection image including the inspection target; a second generation unit that estimates a difference between the first estimation image and the inspection image to generate a second estimation image by using the part of the inspection image; a comparison unit that compares the first estimation image with the inspection image; and an output unit that outputs a comparison result obtained by the comparison unit, and the comparison unit compares a difference between the first estimation image and the inspection image with the second estimation image.

11 Claims, 22 Drawing Sheets

(56) References Cited

U.S. PATENT DOCUMENTS

| | | | |
|---|---|---|---|
| 2002/0031248 A1 | 3/2002 | Maed et al. | |
| 2002/0048393 A1* | 4/2002 | Oosawa | G06T 7/32 |
| | | | 382/132 |
| 2003/0210813 A1 | 11/2003 | Oosawa | |
| 2006/0004282 A1* | 1/2006 | Oosawa | G06T 7/0012 |
| | | | 600/416 |
| 2008/0232667 A1 | 9/2008 | Kitamura et al. | |
| 2014/0079292 A1* | 3/2014 | Kaneko | H04N 1/00068 |
| | | | 382/112 |
| 2017/0112355 A1* | 4/2017 | Hirota | A61B 1/045 |
| 2018/0101944 A1* | 4/2018 | Sakai | G01N 29/0654 |
| 2021/0027440 A1* | 1/2021 | Sakuyama | G06T 3/40 |

FOREIGN PATENT DOCUMENTS

| | | |
|---|---|---|
| JP | 2006-325937 A | 12/2006 |
| JP | 4895204 B2 | 3/2012 |
| JP | 5546317 B2 | 7/2014 |
| JP | 2014-221163 A | 11/2014 |
| JP | 2017-219529 A | 12/2017 |
| JP | 6241576 B1 | 12/2017 |
| WO | 2016/132468 A1 | 8/2016 |

OTHER PUBLICATIONS

International Search Report for PCT Application No. PCT/JP2019/001616, dated Apr. 16, 2019.
Extended European Search Report for EP Application No. EP19744330.2 dated Feb. 8, 2021.

* cited by examiner

IMAGE PROCESSING APPARATUS, IMAGE PROCESSING METHOD, AND STORAGE MEDIUM

This application is a National Stage Entry of PCT/JP2019/001616 filed on Jan. 21, 2019, which claims priority from Japanese Patent Application 2018-012307 filed on Jan. 29, 2018, the contents of all of which are incorporated herein by reference, in their entirety.

TECHNICAL FIELD

The present invention relates to an image processing apparatus, an image processing method, and a storage medium.

BACKGROUND ART

Patent Literature 1 discloses an image component separation apparatus that separates an abnormal component in an input medical image. The image component separation apparatus disclosed in Patent Literature 1 generates, from an input medical image representing a predetermined structure in a subject, a normal image representing normal structure of the structure in the subject. Then, a difference between the input medical image and the normal image is calculated to separate an abnormal component in the input medical image.

CITATION LIST

Patent Literature

PTL 1: Japanese Patent No. 4895204

SUMMARY OF INVENTION

Technical Problem

However, the image component separation apparatus disclosed in Patent Literature 1 generates a normal image from the whole input medical image representing a predetermined structure in the subject. Thus, in the image component separation apparatus disclosed in Patent Literature 1, since the generated normal image may be affected by the whole input medical image, separation of an abnormal component may be significantly affected by an individual difference of the input medical images.

In view of the problem described above, the present invention intends to provide an image processing apparatus, an image processing method, and a storage medium that can distinguish an anomaly while reducing influence of an individual difference of images.

Solution to Problem

According to one example aspect of the present invention, provided is an image processing apparatus including: a first generation unit that generates a first estimation image including at least a predetermined region of an inspection target by using a part of an inspection image including the inspection target; a second generation unit that estimates a difference between the first estimation image and the inspection image to generate a second estimation image by using the part of the inspection image; a comparison unit that compares the first estimation image with the inspection image; and an output unit that outputs a comparison result obtained by the comparison unit, and the comparison unit compares a difference between the first estimation image and the inspection image with the second estimation image.

According to another example aspect of the present invention, provided is an image processing method including: a first generation step of generating a first estimation image including at least a predetermined region of an inspection target by using a part of an inspection image including the inspection target; a second generation step of estimating a difference between the first estimation image and the inspection image to generate a second estimation image by using the part of the inspection image; a comparison step of comparing the first estimation image with the inspection image; and an output step of outputting a comparison result obtained by the comparison step, and the comparison step compares a difference between the first estimation image and the inspection image with the second estimation image.

According to yet another example aspect of the present invention, provided is a storage medium storing a program that causes a computer to perform an image processing method including: a first generation step of generating a first estimation image including at least a predetermined region of an inspection target by using a part of an inspection image including the inspection target; a second generation step of estimating a difference between the first estimation image and the inspection image to generate a second estimation image by using the part of the inspection image; a comparison step of comparing the first estimation image with the inspection image; and an output step of outputting a comparison result obtained by the comparison step, and the comparison step compares a difference between the first estimation image and the inspection image with the second estimation image.

According to yet another example aspect of the present invention, provided is an image processing apparatus including: a first generation unit that generates a second estimation image including at least a predetermined region of an object by using a part of a first image including the object; a second generation unit that estimates a difference between the second image and the first image to generate a third image by using the part of the first image; a comparison unit that compares the second image with the first image; and an output unit that outputs a comparison result obtained by the comparison unit, and the comparison unit compares a difference between the second image and the first image with the third image.

Advantageous Effects of Invention

According to the present invention, it is possible to distinguish an anomaly at high accuracy while reducing influence of an individual difference of images.

DESCRIPTION OF EMBODIMENTS

Example Embodiment

An image processing apparatus and an image processing method according to one example embodiment of the present invention will be described with reference to FIG. 1 to FIG. 20.

Figure 1:
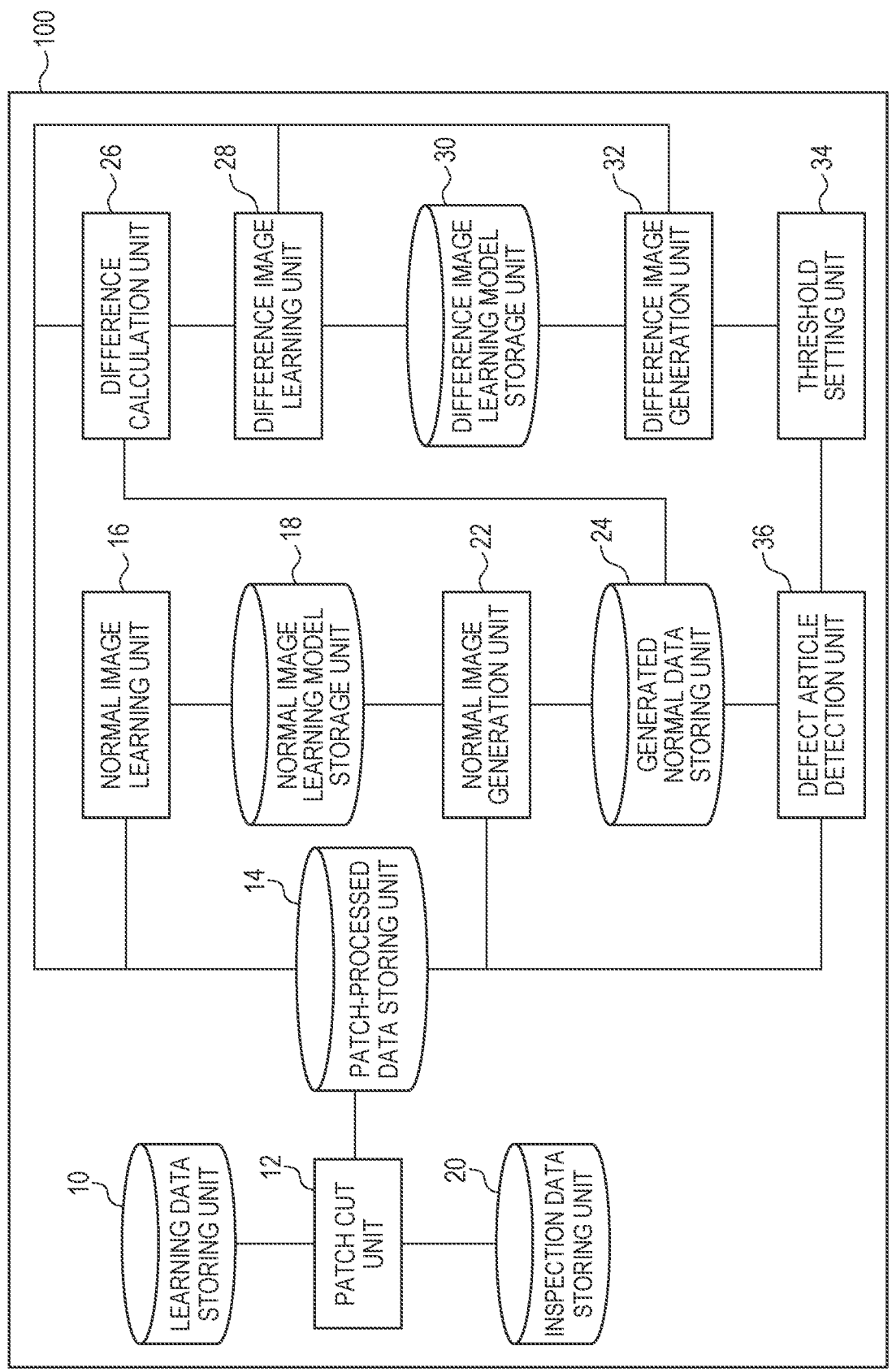
FIG. 1 is a block diagram illustrating a function configuration of an image processing apparatus according to one example embodiment of the present invention.
Figure 2:
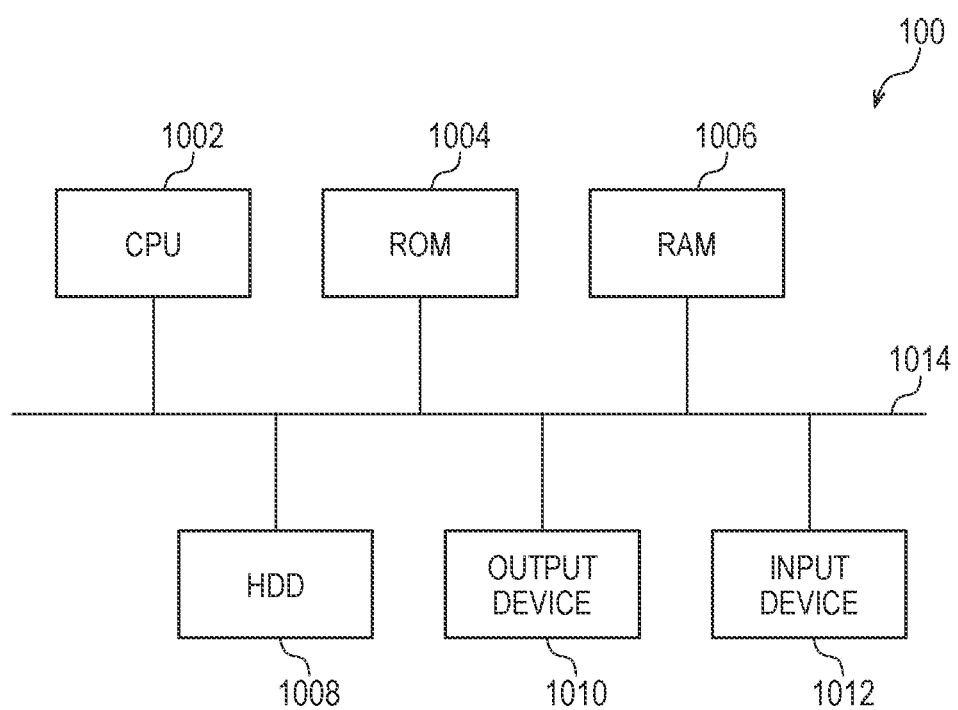
FIG. 2 is a block diagram illustrating a hardware configuration example of the image processing apparatus according to one example embodiment of the present invention.

First, the configuration of the image processing apparatus according to the present example embodiment will be described with reference to FIG. 1 and FIG. 2. FIG. 1 is a block diagram illustrating a function configuration of the image processing apparatus according to the present example embodiment. FIG. 2 is a block diagram illustrating a hardware configuration example of the image processing apparatus according to the present example embodiment.

In the present example embodiment, a case where the image processing apparatus processes an inspection image including an inspection target article that is an inspection target, thereby determines whether the inspection target article is a normal article or a defect article, and performs inspection to detect a defect article as an anomaly will be described as an example. Note that the image processing apparatus according to the present example embodiment can be widely used not only for performing inspection to detect a defect article but also for detecting an anomaly for an object.

As illustrated in FIG. 1, an image processing apparatus 100 according to the present example embodiment has a learning data storing unit 10, a patch cut unit 12, and a patch-processed data storing unit 14. Further, the image processing apparatus 100 has a normal image learning unit 16 and a normal image learning model storage unit 18. Further, the image processing apparatus 100 has an inspection data storing unit 20, a normal image generation unit 22, and a generated normal data storing unit 24.

Further, the image processing apparatus 100 according to the present example embodiment has a difference calculation unit 26, a difference image learning unit 28, a difference image learning model storage unit 30, a difference image generation unit 32, a threshold setting unit 34, and a defect article detection unit 36.

The learning data storing unit 10 stores a learning image used for learning performed by the normal image learning unit 16. The learning image is an image including a normal article of an inspection target article, that is, an image representing a normal state of the inspection target article.

The patch cut unit 12 reads learning image data from the learning data storing unit 10 and performs a patch cut step on the learning image. That is, the patch cut unit 12 cuts out a patch size image as a patch image from a learning image. Further, the patch cut unit 12 cuts out an image of the center part as a center image from the patch image. The center image includes at least a predetermined region of an inspection target article. The patch cut unit 12 outputs a pair of a center-removed patch image, which is a patch image from which the center image has been cut out, and the center image thereof in association with each other as an image pair. The patch cut unit 12 stores the image pair output for the learning image in the patch-processed data storing unit 14.

Further, the patch cut unit 12 reads inspection image data from the inspection data storing unit 20 and performs a patch cut process on an inspection image as with the case of the learning image. The patch cut unit 12 outputs a pair of a center-removed patch image and the center image thereof in association with each other as an image pair for the inspection image as with the case of the learning image. The patch cut unit 12 stores the image pair output for the inspection image in the patch-processed data storing unit 14.

The patch-processed data storing unit 14 stores an image pair for a learning image output by the patch cut unit 12. Further, the patch-processed data storing unit 14 stores an image pair for an inspection image output by the patch cut unit 12.

The normal image learning unit 16 reads an image pair for a learning image from the patch-processed data storing unit 14 and creates a learning model by using the read image pair. The normal image learning unit 16 performs learning by using a center-removed patch image as learning data and using a center image as training data out of the image pair for a learning image. Thereby, the normal image learning unit 16 creates a normal image learning model that is a learning model used for restoring the center image from the center-removed patch image. The normal image learning unit 16 stores the created normal image learning model in the normal image learning model storage unit 18.

The normal image learning model storage unit 18 stores a trained normal image learning model created as a result of learning performed by the normal image learning unit 16.

The inspection data storing unit 20 stores an inspection image. The inspection image is an image including an inspection target article that is an inspection target. The inspection target article is not particularly limited. The image processing apparatus according to the present example embodiment can define any object such as a completed article or a component, for example, as an inspection target article.

The normal image generation unit 22 functions as a first generation unit, which estimates, from a center-removed patch image out of an image pair for a learning image or an inspection image, a center image that is an image of the center part thereof and generates, as a normal image, an estimation image estimated by the center-removed patch image. The normal image includes at least a predetermined region of an inspection target article included in a learning image or an inspection image. The normal image generation unit 22 reads a center-removed patch image out of an image pair for a learning image or an inspection image from the patch-processed data storing unit 14. The normal image generation unit 22 estimates a center image of a center-removed patch image from the read center-removed patch image and generates it as a normal image.

When generating the normal image that is an estimation image, the normal image generation unit 22 reads the trained normal image learning model from the normal image learning model storage unit 18. The normal image generation unit 22 estimates a center image from a center-removed patch image that is a part of a patch image in a learning image or an inspection image by using the read normal image learning model and generates the estimated estimation image as a normal image. The normal image generation unit 22 stores the generated normal image in the generated normal data storing unit 24.

In such a way, the normal image generation unit 22 estimates and generates a normal image by using a center-removed patch image that is a part of a patch image for a learning image or an inspection image. The normal image generated for a learning image is used for threshold setting described later. Further, the normal image generated for an inspection image is used for defect detection described later.

The generated normal data storing unit 24 stores the normal image generated by the normal image generation unit 22.

The difference calculation unit 26 calculates a difference between a normal image generated by the normal image generation unit 22 from a center-removed patch image out of an image pair for a learning image and a center image paired with the center-removed patch image to form the image pair. Thereby, for the learning image, the difference calculation unit 26 generates a difference image in which the absolute value of the difference in pixel values for each pixel between the center image and the normal image is the pixel value. Note that the calculation method of a difference performed by the difference calculation unit 26 is the same as the calculation method of a difference performed by the defect article detection unit 36 described later.

The difference image learning unit 28 creates a learning model by using a difference image generated by the difference calculation unit 26 and a center-removed patch image used in the estimation of the normal image from which the difference image has been generated. The difference image learning unit 28 performs learning by using a center-removed patch image as learning data and using a difference image as training data. Thereby, the difference image learning unit 28 creates a difference image learning model that is a learning model that restores a difference image from a center-removed patch image. The difference image learning unit 28 stores the created difference image learning model in the difference image learning model storage unit 30.

The difference image learning model storage unit 30 stores a trained difference image learning model created as a result of learning performed by the difference image learning unit 28.

The difference image generation unit 32 functions as a second generation unit, which estimates and generates a difference image from a center-removed patch image out of an image pair for an inspection image. The difference image generation unit 32 reads the center-removed patch image out of the image pair for the inspection image from the patch-processed data storing unit 14. The difference image generation unit 32 estimates and generates a difference image from the read center-removed patch image. When generating the difference image that is the estimation image, the difference image generation unit 32 reads a trained difference image learning model from the difference image learning model storage unit 30. The difference image generation unit 32 uses the read difference image learning model to estimate and generate a difference image from the center-removed patch image that is a part of the patch image in the inspection image.

The threshold setting unit 34 sets a threshold used for defect detection in the defect article detection unit 36 based on the difference image generated by the difference image generation unit 32. The threshold setting unit 34 can set each pixel value of a difference image, for example, as a threshold for each pixel. Further, the threshold setting unit 34 can set a value obtained by multiplying each pixel value of a difference image by a constant multiplying factor and adding a margin, for example, as a threshold for each pixel.

The defect article detection unit 36 functions as a comparison unit, which compares a center image out of an image pair for an inspection image with a normal image generated from a center-removed patch image thereof and detects a defect based on the threshold set by the threshold setting unit 34. Moreover, the defect article detection unit 36 functions as an output unit, which outputs a detection result of a defect. Further, the defect article detection unit 36 functions as a determination unit, which determines whether an inspection target article included in an inspection image is a normal article or a defect article based on the detection result.

The defect article detection unit 36 reads a center image out of an image pair for the inspection image from the patch-processed data storing unit 14. Further, the defect article detection unit reads, from the generated normal data storing unit 24, a normal image generated from a center-removed patch image out of the image pair. The defect article detection unit 36 calculates a difference between each read center image and a normal image. Accordingly, for an inspection image, the defect article detection unit 36 generates a difference image in which the absolute value of a difference in pixel values on a pixel basis between the center image and the normal image is the pixel value The defect article detection unit 36 compares a difference image generated for an inspection image with a difference image generated by the difference image generation unit 32. More specifically, the defect article detection unit 36 compares a pixel value of a difference image generated for an inspection image with a threshold set by the threshold setting unit 34 on a pixel basis and detects a defective pixel in the center image for the inspection image. The defect article detection unit 36 determines the quality of an inspection target article as to whether an inspection target article included in an inspection image is a normal article or a defect article based on the detected defect pixel and determines and detects a defect article that is an anomaly.

The defect article detection unit 36 outputs a detection result of a defect article. An output method of the detection result is not particularly limited, and various methods may be used. For example, the defect article detection unit 36 can cause a display apparatus to display a detection result, output the detection result as a voice from an audio output apparatus, and store the detection result in a database stored in a storage apparatus.

The image processing apparatus 100 described above is formed of a computer apparatus, for example. An example of a hardware configuration of the image processing apparatus 100 will be described with reference to FIG. 2. Note that the image processing apparatus 100 may be formed of a single apparatus or may be formed of two or more physically separated apparatuses connected by wired or wireless connection.

As illustrated in FIG. 2, the image processing apparatus 100 has a central processing unit (CPU) 1002, a read only memory (ROM) 1004, a random access memory (RAM) 1006, and a hard disk drive (HDD) 1008. Further, the image processing apparatus 100 has an output device 1010 and an input device 1012. The CPU 1002, the ROM 1004, the RAM 1006, the HDD 1008, the output device 1010, and the input device 1012 are connected to a common bus line 1014.

The CPU 1002 controls the overall operation of the image processing apparatus 100. Further, the CPU 1002 executes a program to realize functions of each unit of the patch cut unit 12, the normal image learning unit 16, the normal image generation unit 22, the difference calculation unit 26, the difference image learning unit 28, the difference image generation unit 32, the threshold setting unit 34, and the defect article detection unit 36 described above. The CPU 1002 implements functions of each unit of the patch cut unit 12, the normal image learning unit 16, and the normal image generation unit 22 by loading a program stored in the HDD 1008 or the like to the RAM 1006 and executing the program. Further, the CPU 1002 implements functions of each unit of the difference calculation unit 26, the difference image learning unit 28, the difference image generation unit 32, the threshold setting unit 34, and the defect article detection unit 36 by loading a program stored in the HDD 1008 or the like to the RAM 1006 and executing the program.

Note that the patch cut unit 12, the normal image learning unit 16, the normal image generation unit 22, the difference calculation unit 26, the difference image learning unit 28, the difference image generation unit 32, the threshold setting unit 34, and the defect article detection unit 36 may be implemented by a circuitry, respectively. Herein, the circuitry is a term conceptually including a single device, multiple devices, a chipset, or a cloud.

A program such as a boot program is stored in the ROM 1004. The RAM 1006 is used as a working area when the CPU 1002 executes a program. Further, a program executed by the CPU 1002 is stored in the HDD 1008.

Further, the HDD 1008 is a storage device that implements functions of each unit of the above learning data storing unit 10, the patch-processed data storing unit 14, the normal image learning model storage unit 18, the generated normal data storing unit 24, and the difference image learning model storage unit 30. Note that a storage device that implements functions of each unit of the learning data storing unit 10, the patch-processed data storing unit 14, the normal image learning model storage unit 18, the generated normal data storing unit 24, and the difference image learning model storage unit 30 is not limited to the HDD 1008. Various storage devices can be used for implementing functions of respective units.

The output device 1010 is a device that outputs a result of inspection performed by the defect article detection unit 36 and may be, for example, a display device or an audio output device.

The input device 1012 is a keyboard, a mouse, or the like, for example. Further, the input device 1012 may be a touch panel embedded in a display device that is the output device 1010. An operator of the image processing apparatus 100 can set the image processing apparatus 100 via the input device 1012 or can input an instruction of performing a process.

Note that a hardware configuration of the image processing apparatus 100 is not limited to the configuration described above, and various configuration can be used.

Next, an operation of the image processing apparatus 100 according to the above present example embodiment will be further described with reference to FIG. 3 to FIG. 16. When operating, the image processing apparatus 100 according to the present example embodiment performs an image processing method.

Figure 10:
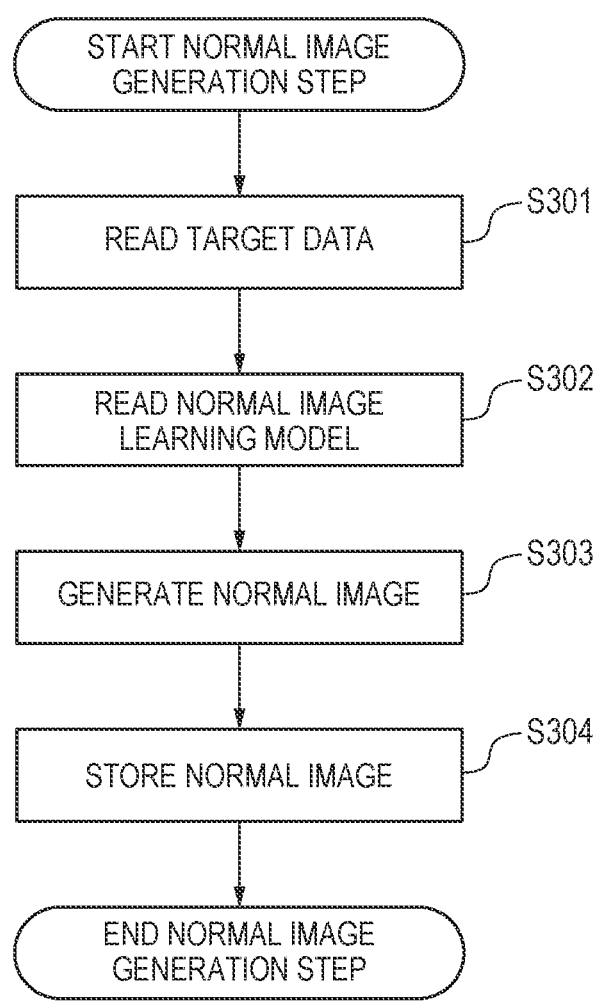
FIG. 10 is a flowchart illustrating a normal image generation step in the operation of the image processing apparatus according to one example embodiment of the present invention.

The operation of the image processing apparatus 100 according to the present example embodiment includes a patch cut step (see FIG. 3), a normal image learning step (see FIG. 7), and a normal image generation step (see FIG. 10). Further, the operation of the image processing apparatus 100 includes a difference image learning step (see FIG. 12) and a defect article detection step (see FIG. 14). The patch cut step is performed by the patch cut unit 12. The normal image learning step is performed by the normal image learning unit 16. The normal image generation step is performed by the normal image generation unit 22. The difference image learning step is performed by the difference image learning unit 28. The defect article detection step is performed by the defect article detection unit 36.

Figure 3:
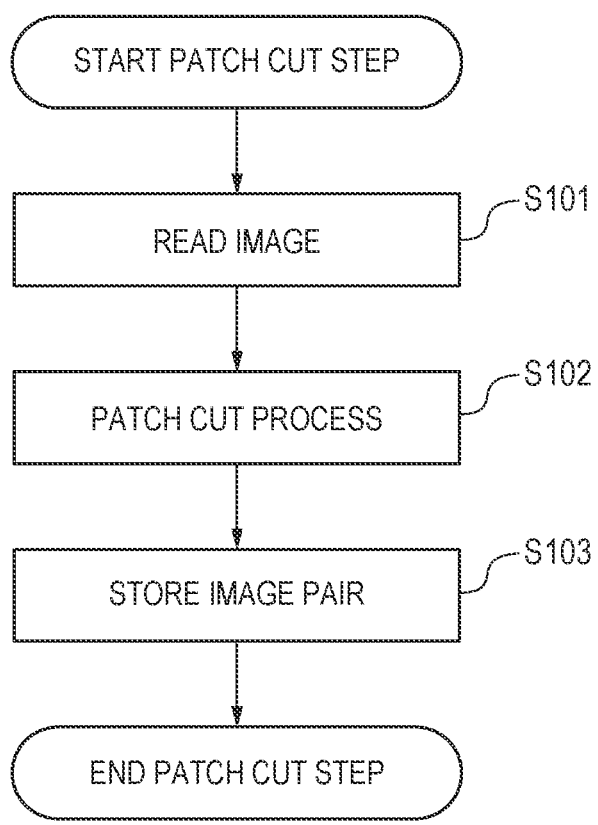
FIG. 3 is a flowchart illustrating a patch cut step in the operation of the image processing apparatus according to one example embodiment of the present invention.
Figure 4:
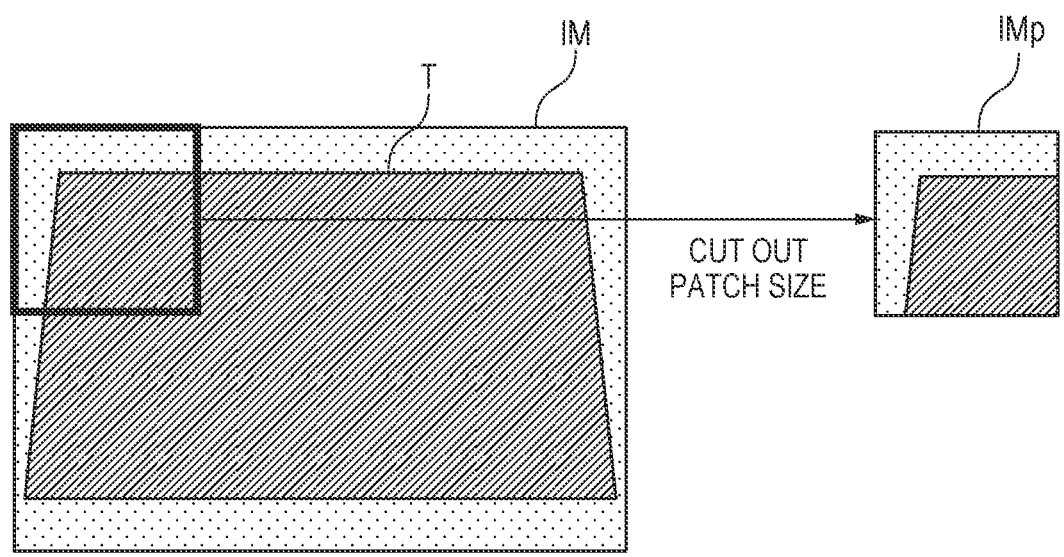
FIG. 4 is a schematic diagram (1) illustrating the patch cut step in the operation of the image processing apparatus according to one example embodiment of the present invention.
Figure 5:
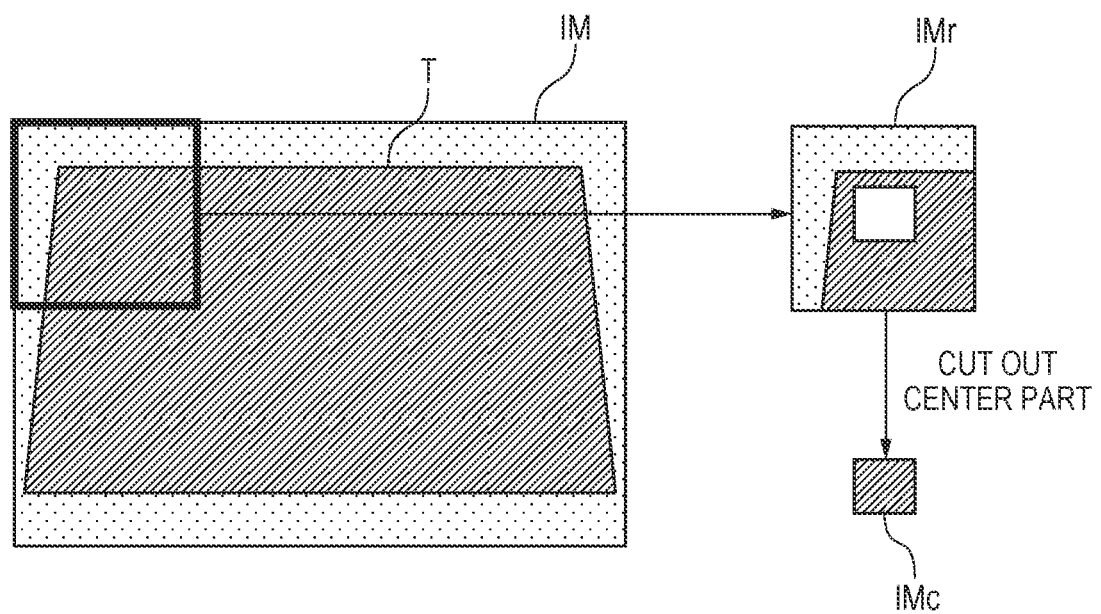
FIG. 5 is a schematic diagram (2) illustrating the patch cut step in the operation of the image processing apparatus according to one example embodiment of the present invention.
Figure 6:
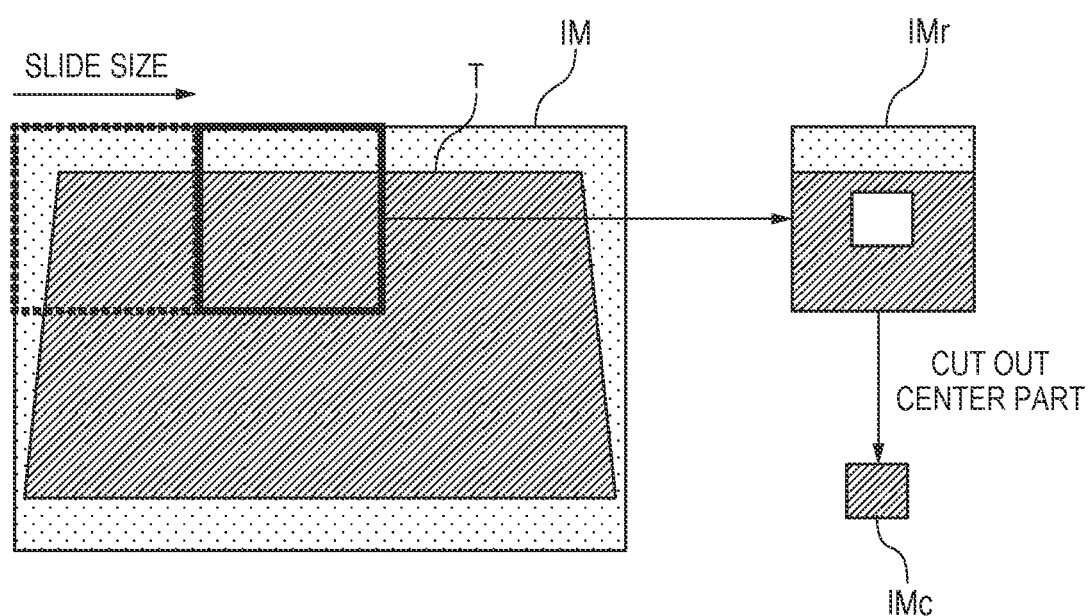
FIG. 6 is a schematic diagram (3) illustrating the patch cut step in the operation of the image processing apparatus according to one example embodiment of the present invention.

First, the patch cut step in the operation of the image processing apparatus 100 according to the present example embodiment will be described with reference to FIG. 3 to FIG. 6. FIG. 3 is a flowchart illustrating the patch cut step in the operation of the image processing apparatus 100 according to the present example embodiment. FIG. 4 to FIG. 6 are schematic diagrams illustrating the patch cut step in the operation of the image processing apparatus 100 according to the present example embodiment.

The patch cut step performed by the patch cut unit 12 performs cutting of a patch image from an image, removal of an image of a center part of the patch image, or the like. The patch cut step is performed for each of a learning image and an inspection image.

First, as illustrated in FIG. 3, in step S101, the patch cut unit 12 reads data of an image on which the patch cut step is to be performed. When the patch cut step is performed on the learning image, the patch cut unit 12 reads the learning image from the learning data storing unit 10. On the other hand, when the patch cut step is performed on the inspection image, the patch cut unit 12 reads image data from the inspection data storing unit 20.

Next, in step S102, the patch cut unit 12 performs a patch cut process on the image read in step S101. As illustrated in FIG. 4, an image IM read in step S101 includes an inspection target article T. The image IM is a learning image or an inspection image. When the image IM is a learning image, the inspection target article T included in the image IM is a normal article. When the image IM is an inspection image, the inspection target article T included in the image IM is an article that is to be determined whether it is a normal article or a defect article.

In the patch cut process, as illustrated in FIG. 4, the patch cut unit 12 cuts out a rectangular image having a preset patch size from the read image IM as a patch image IMp, for example, from the left upper of the image IM. Note that the patch size used for cutting the patch image IMp can be appropriately set in accordance with accuracy or the like required for the inspection within a range of the size that is smaller than the image IM.

Moreover, in the patch cut process, as illustrated in FIG. 5, the patch cut unit 12 cuts out and removes a rectangular image having a preset size from the center part of the cut patch image IMp. In such a way, the patch cut unit 12 creates a center-removed patch image IMr, which is a frame-shape patch image IMp for which an image of the center part has been removed, and creates a center image IMc, which is an image cut out of the center part of the patch image IMp. The patch image IMp obtained before the patch cut process is performed includes the center-removed patch image IMr that is a first region and the center image IMc that is a second region and can be considered to be formed of both images. Note that the size at which the center image IMc is cut out can be appropriately set in accordance with accuracy or the like required for the inspection within a range of the size that is smaller than the patch image IMp.

As illustrated in FIG. 6, the patch cut unit 12 then cuts out the patch image IMp from the position that has moved in the slide direction in the image IM by a preset slide size in the same manner as described above and creates the center-removed patch image IMr and the center image IMc. Note that the slide size can be set to be equal to or smaller than the width in the slide direction of the patch size for cutting out the patch image IMp.

The patch cut unit 12 repeatedly performs the operation illustrated in FIG. 4 to FIG. 6 described above for the whole region of the image IM before the patch image IMp is cut out and creates an image pair that is a pair of the center-removed patch image IMr and the center image IMc for the image IM.

Note that, while both the patch image IMp and the center image IMc are rectangular in the above description, the shapes thereof are not limited to a quadrilateral such as a rectangular. The shape of the patch image IMp and the center image IMc may be any shape that can be used for creating a pair of the center-removed patch image IMr, which is a peripheral image, and the center image IMc, such as a circle or a triangle, for example, in addition to a quadrilateral. The shape of the patch image IMp and the center image IMc is not required to be the same image or may be different from each other.

Further, while an image is cut out of a center part of the patch image IMp in the above description, when a preset size image is cut out of the patch image IMp, a region from which an image is cut out of the patch image IMp is not limited to the center part. That is, the patch cut unit 12 may cut out a part of the patch image IMp and create a partial image that is a part of the patch image IMp instead of the center image IMc. When a partial image that is a part of the patch image IMp is created instead of the center image IMc, the same process is applied except for using the partial image instead of the center image IMc.

Next, in step S103, the patch cut unit 12 stores an image pair that is a pair of the center-removed patch image IMr and the center image IMc created for the image IM in step S102 in the patch-processed data storing unit 14.

As described above, the patch cut unit 12 performs the patch cut step for a learning image and an inspection image, respectively. Note that the patch cut step for the learning image is performed before the learning step. On the other hand, the patch cut step for an inspection image can be performed before the learning step or performed after the learning step as long as the patch cut step is performed before the normal image generation step.

Figure 7:
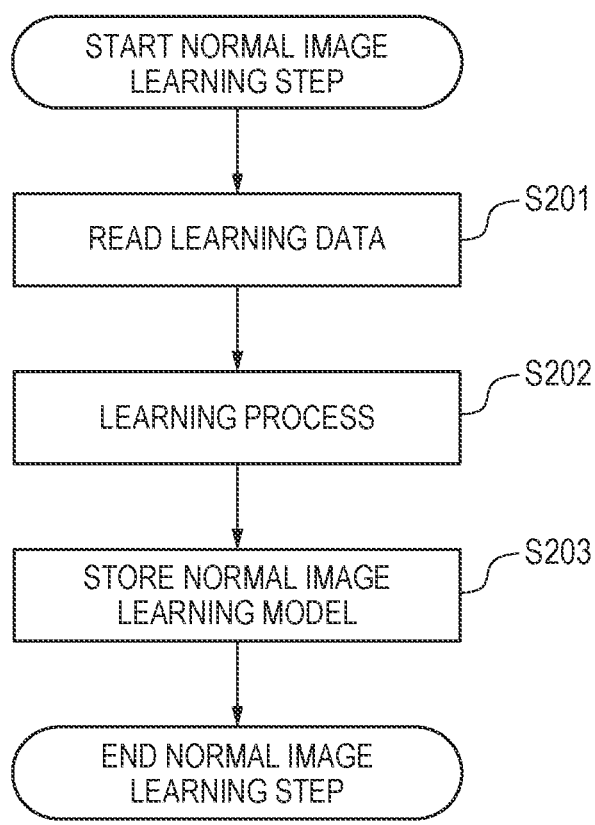
FIG. 7 is a flowchart illustrating a normal image learning step in the operation of the image processing apparatus according to one example embodiment of the present invention.
Figure 8:
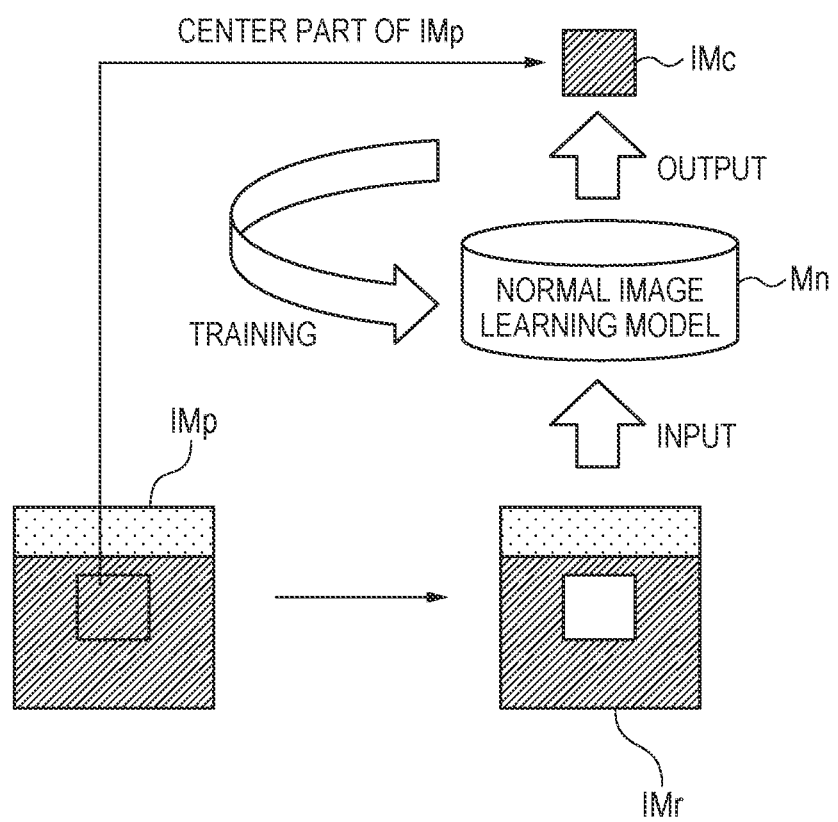
FIG. 8 is a schematic diagram (1) illustrating the normal image learning step in the operation of the image processing apparatus according to one example embodiment of the present invention.
Figure 9:
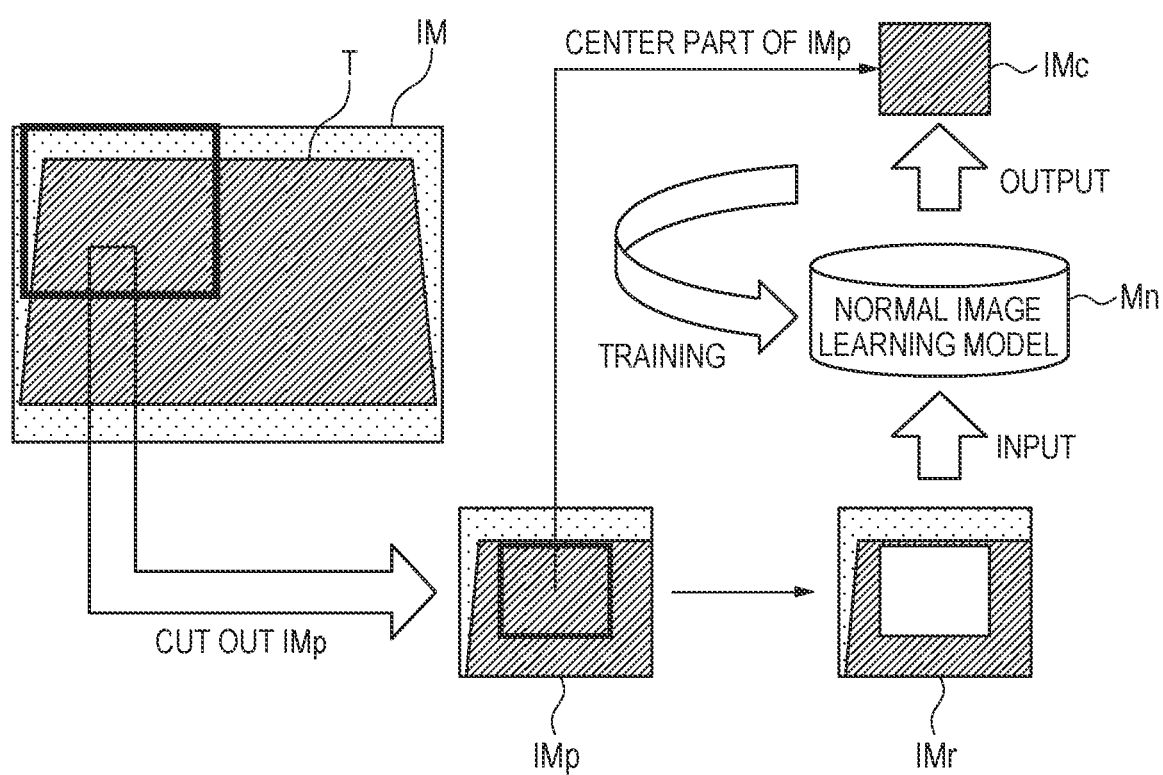
FIG. 9 is a schematic diagram (2) illustrating the normal image learning step in the operation of the image processing apparatus according to one example embodiment of the present invention.

Next, the normal image learning step in the operation of the image processing apparatus 100 according to the present example embodiment will be described with reference to FIG. 7 to FIG. 9. FIG. 7 is a flowchart illustrating the normal image learning step in the operation of the image processing apparatus 100 according to the present example embodiment. FIG. 8 and FIG. 9 are schematic diagrams illustrating the normal image learning step in the operation of the image processing apparatus 100 according to the present example embodiment.

The normal image learning step performed by the normal image learning unit 16 is performed after the patch cut step for the learning image. The normal image learning step performs supervised machine learning by using the learning image data on which the patch cut step has been performed and creates a learning model.

First, as illustrated in FIG. 7, in step S201, the normal image learning unit 16 reads learning data used for the supervised machine learning from the patch-processed data storing unit 14. Here, the learning data read by the normal image learning unit 16 is data of the image pair that is a pair of a center-removed patch image and a center image created for a learning image.

Next, in step S202, the normal image learning unit 16 performs a learning process in which learning is performed by using a center-removed patch image as learning data and a center image as training data out of image pairs of the learning data read in step S201. The normal image learning unit 16 trains a learning model by using the center-removed patch image and the center image created for the learning image that is an image representing the normal state of an inspection target article.

FIG. 8 and FIG. 9 illustrate a view of learning performed by the normal image learning unit 16 in step S202. As illustrated in FIG. 8, the normal image learning unit 16 creates a normal image learning model Mn that is a learning model that generates an estimation image used for estimating the center image IMc by restoring the center image IMc that is training data from the center-removed patch image IMr of learning data. Herein, as a scheme for creating the normal image learning model Mn, the normal image learning unit 16 can use a scheme that can reproduce input, such as an autoencoder, for example. Further, the normal image learning unit 16 can perform machine learning using deep learning as a learning scheme, for example. As illustrated in FIG. 9, for the image IM that is a learning image, the normal image learning unit 16 performs learning for creating the normal image learning model Mn by using a plurality of image pairs of the center-removed patch image IMr and the center image IMc that are created from the cut patch image IMp. In such a way, the normal image learning model Mn trained by using the center-removed patch image IMr and the center image IMc created for the learning image that is an image representing the normal state of an inspection target article is created.

Next, in step S203, the normal image learning unit 16 stores the trained normal image learning model created in step S202 in the normal image learning model storage unit 18.

As described above, the normal image learning unit 16 creates the normal image learning model used for restoring the center image that is the other part of the patch image from the center-removed patch image that is a part of the patch image. The normal image learning unit 16 can create a normal image learning model by performing the learning step before the normal image generation step described later and store the created normal image learning model in the normal image learning model storage unit 18 in advance.

In general, in machine learning such as deep learning, a large amount of correct answer data is required to achieve high accuracy. When distinguishing a normal article and a defect article, it is necessary to collect a sufficient amount of data for both normal articles and defect articles as correct answer data. At a site in the actual implementation, however, it is difficult to sufficiently collect data on defect articles.

On the other hand, in the present example embodiment, since machine learning is performed by using a center-removed patch image and a center image that are created from the learning image that is an image including a normal article of an inspection target article, an image including a defect article of an inspection target article is not required to be prepared as a learning image. Therefore, according to the present example embodiment, since sufficient amount of learning data can be easily prepared, the learning model can be easily created.

Figure 11:
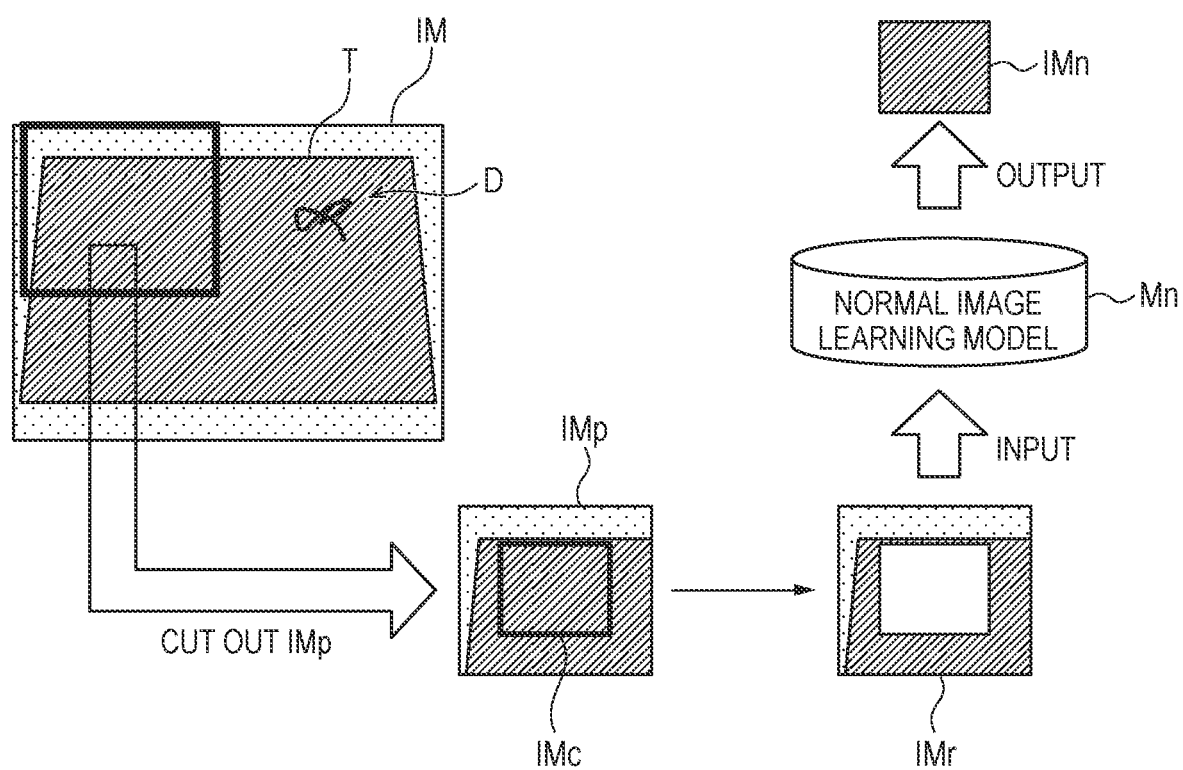
FIG. 11 is a schematic diagram illustrating the normal image generation step in the operation of the image processing apparatus according to one example embodiment of the present invention.

Next, the normal image generation step in the operation of the image processing apparatus 100 according to the present example embodiment will be described with reference to FIG. 10 and FIG. 11. FIG. 10 is a flowchart illustrating the normal image generation step in the operation of the image processing apparatus 100 according to the present example embodiment. FIG. 11 is a schematic diagram illustrating the normal image generation step in the operation of the image processing apparatus 100 according to the present example embodiment.

The normal image generation step performed by the normal image generation unit 22 uses a learning model and a center-removed patch image of a learning image or an inspection image to generate a normal image that is an estimation image used for estimating a center image of a learning image or an inspection image. The normal image generated for the learning image is used for threshold setting. The normal image generated for the inspection image is used for defect detection.

First, as illustrated in FIG. 10, in step S301, the normal image generation unit 22 reads target data used for generating a normal image from the patch-processed data storing unit 14. Herein, the target data read by the normal image generation unit 22 is the center-removed patch image data created in the patch cut step from the learning image data of the learning data storing unit 10 or the inspection image data of the inspection data storing unit 20. The normal image generation unit 22 uses the center-removed patch image out of an image pair created for the learning image or the inspection image by the patch cut unit 12 as an image to be input to a learning model.

Next, in step S302, the normal image generation unit 22 reads the trained learning model from the normal image learning model storage unit 18. Note that step S301 and step S302 may be performed at different times or may be performed at the same time.

Next, in step S303, the normal image generation unit 22 uses the learning model read in step S302 to generate a normal image by using the center-removed patch image read in step S301. The normal image generation unit 22 uses a learning model to estimate and generate, as a normal image, a center image for the case where an inspection target article is a normal article from the center-removed patch image for the learning image or the inspection image read in step S301.

FIG. 11 illustrates a view of generation of a normal image for an inspection image performed by the normal image generation unit 22 in step S303. As illustrated in FIG. 11, the normal image generation unit 22 uses the center-removed patch image IMr created from the cut patch image IMp as an input for the normal image learning model Mn for the image IM that is an inspection image. The normal image generation unit 22 generates, as output of the normal image learning model Mn for input of the center-removed patch image IMr, a normal image IMn that is an image in which the center image IMc for the case where an inspection target article is a normal article is estimated. Note that an inspection target article T included in the image IM that is an inspection image may have a defect D such as a scratch. Also for a learning image, a normal image can be generated in the same manner as in the case of the inspection image illustrated in FIG. 11.

Next, in step S304, the normal image generation unit 22 stores the normal image created in step S303 in the generated normal data storing unit 24.

As described above, the normal image generation unit 22 uses a learning model to generate a normal image for each of the plurality of center-removed patch images created from the learning image or the inspection image.

As a method for detecting a defect article, a scheme for preparing a template of a normal article to detect a defect article based on a difference between the template and an inspection image without using machine learning is considered. In such a method using a template, however, detection of a defect article may be affected by an individual difference of inspection target articles, that is, an individual difference of inspection images.

In contrast, in the present example embodiment, a normal image is estimated and generated from a center-removed patch image in an inspection image, and a defect article is detected based on the estimated normal image. Thus, in the present example embodiment, detection of a defect article with high robustness can be realized unlike the case where a template of a normal article is used.

Furthermore, in the present example embodiment, since a threshold used is set for defect detection as described later, a defect article can be detected at high accuracy even when the image of a normal article has variation.

Figure 12:
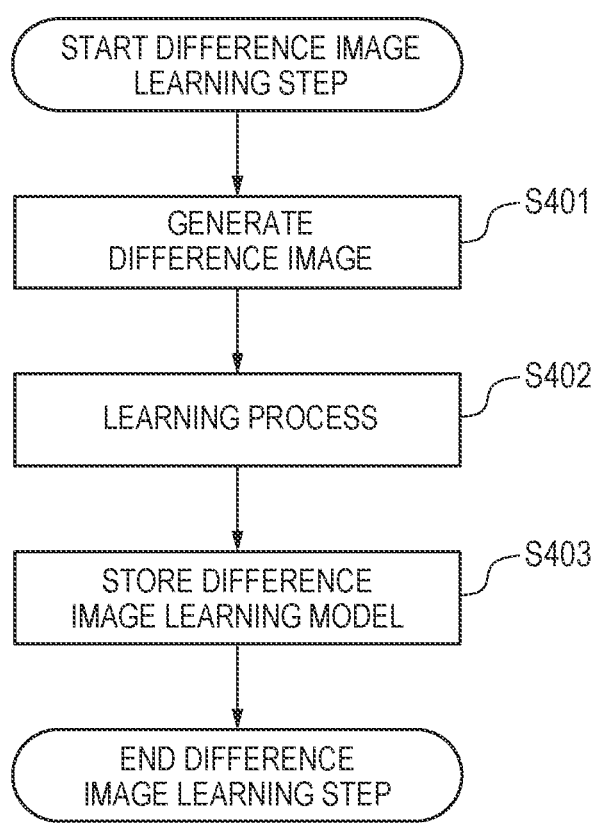
FIG. 12 is a flowchart illustrating a difference image learning step in the operation of the image processing apparatus according to one example embodiment of the present invention.
Figure 13:
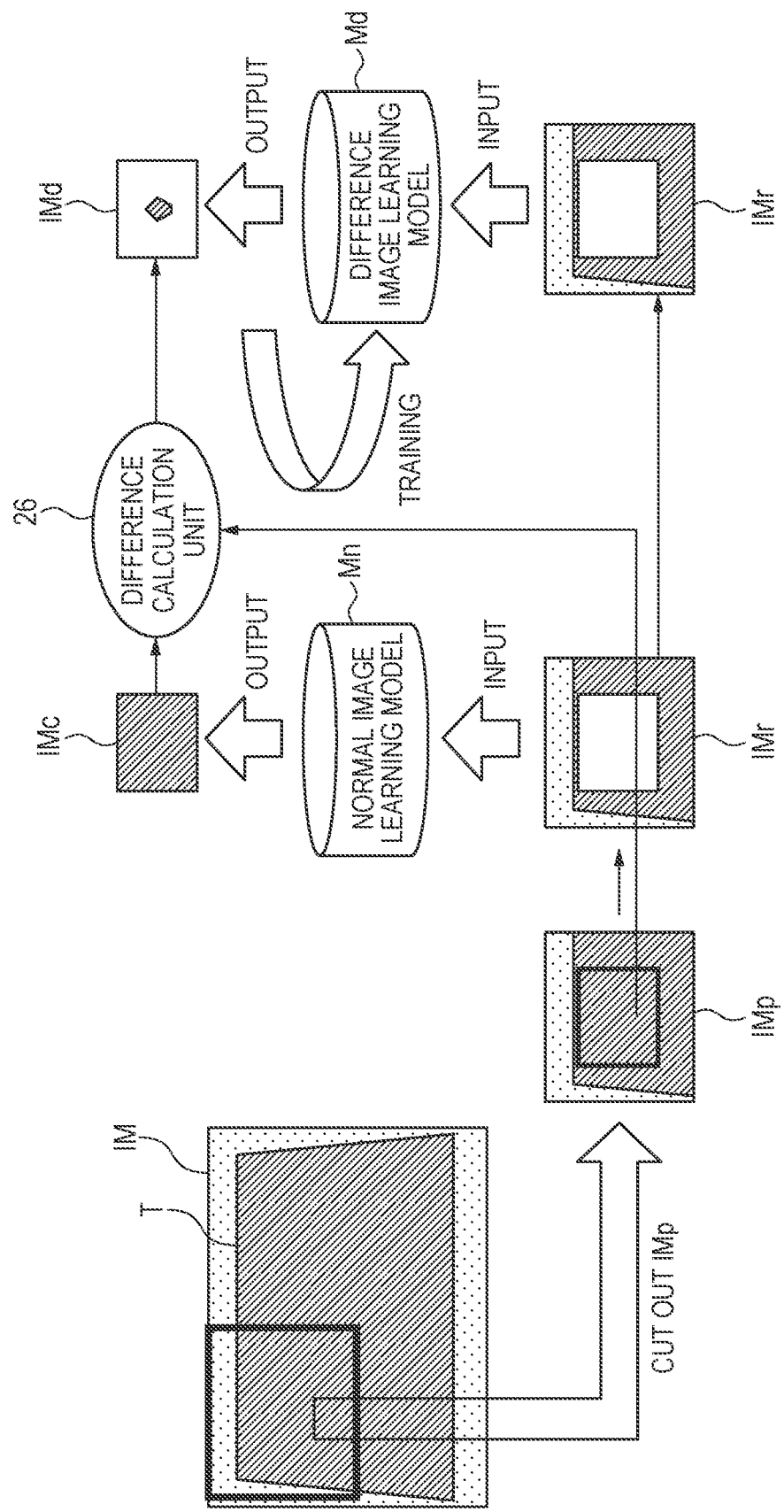
FIG. 13 is a schematic diagram illustrating the difference image learning step in the operation of the image processing apparatus according to one example embodiment of the present invention.

Next, the difference image learning step in the operation of the image processing apparatus 100 according to the present example embodiment will be described with reference to FIG. 12 and FIG. 13. FIG. 12 is a flowchart illustrating the difference image learning step in the operation of the image processing apparatus 100 according to the present example embodiment. FIG. 13 is a schematic diagram illustrating the difference image learning step in the operation of the image processing apparatus 100 according to the present example embodiment.

The difference image learning step performed by the difference image learning unit 28 is performed after the normal image generation step for a learning image. The difference image learning step creates a learning model by performing supervised machine learning using data of the learning image on which the patch cut step has been performed and data of the difference image generated by the difference calculation unit 26.

First, as illustrated in FIG. 12, in step S401, the difference calculation unit 26 generates a difference image used for machine learning in the difference image learning unit 28. In the generation of a difference image, the difference calculation unit 26 calculates the difference between the normal image generated by the normal image generation unit 22 from a center-removed patch image out of an image pair for a learning image and the center image paired with the center-removed patch image to form the image pair. Thereby, the difference calculation unit 26 generates a difference image in which the absolute value of the difference in pixel values for each pixel between the center image and the normal image is the pixel value for the learning image.

Next, in step S402, the difference image learning unit 28 performs a learning process of performing learning by using the center-removed patch image created for the learning image as the learning data and using the difference image generated in step S401 as the training data. The difference image learning unit 28 reads the center-removed patch image used as the learning data from the patch-processed data storing unit 14. The difference image learning unit 28 uses the center-removed patch image created for the learning image and the difference image to train the learning model.

FIG. 13 illustrates a view of learning performed by the difference image learning unit 28 in step S402. As illustrated in FIG. 13, the difference image learning unit 28 creates a difference image learning model Md that is a learning model used for generating an estimation image in which a difference image IMd is estimated by restoring the difference image IMd used as training data from the center-removed patch image IMr of the learning data. Herein, the difference image learning unit 28 can use a scheme that can reproduce input, such as an autoencoder, as a scheme for creating the difference image learning model Md. Further, the difference image learning unit 28 can perform machine learning using deep learning as a learning scheme, for example. The difference image learning unit 28 performs learning for creating the difference image learning model Md by using a plurality of image pairs of the center-removed patch image IMr and the difference image IMd created from the cut patch image IMp for the image IM that is a learning image. In such a way, the difference image learning model Md trained by using the center-removed patch image IMr and the difference image IMd created for the learning image is created.

Next, in step S403, the difference image learning unit 28 stores the trained difference image learning model created in step S402 in the difference image learning model storage unit 30.

Figure 14:
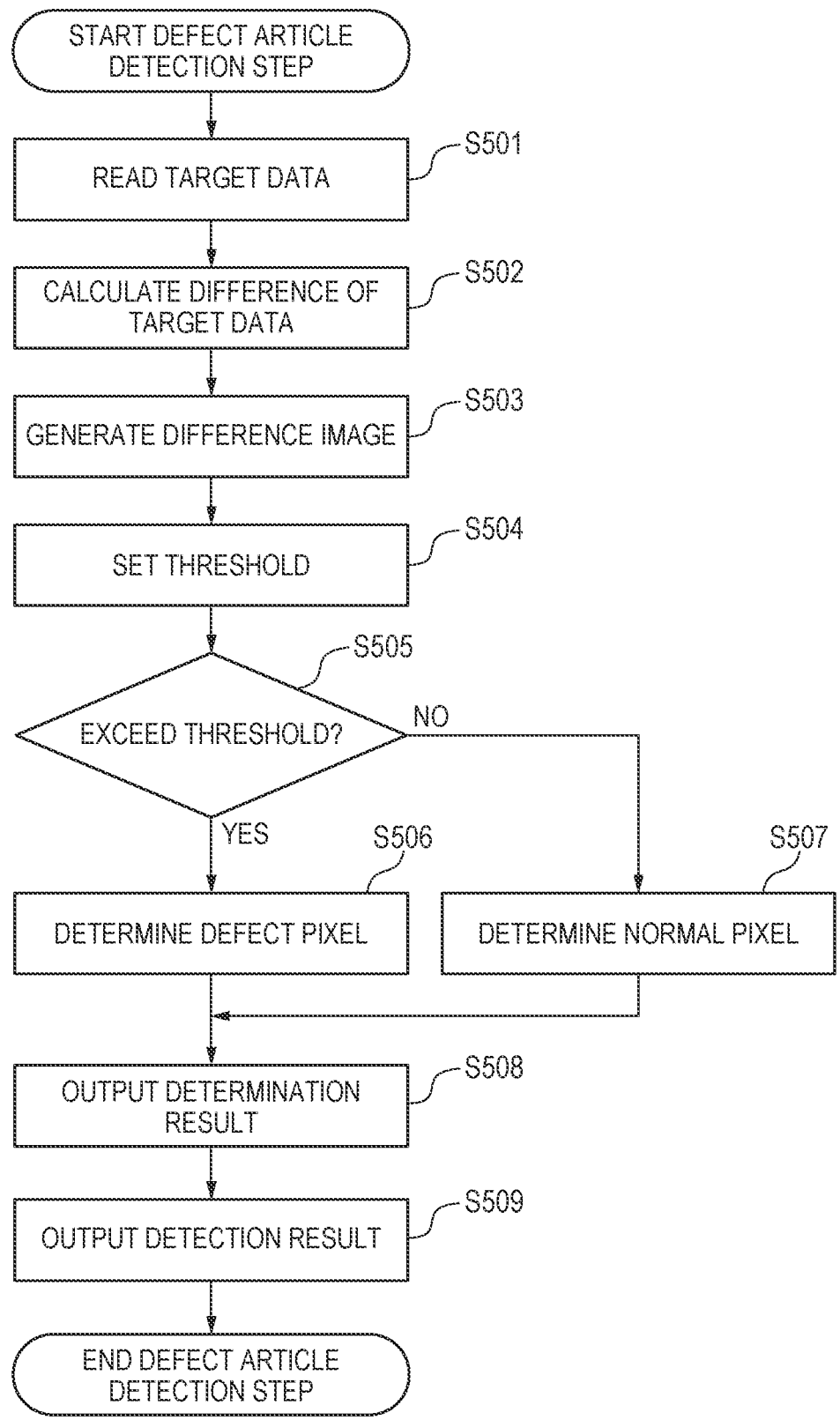
FIG. 14 is a flowchart illustrating a defect article detection step in the operation of the image processing apparatus according to one example embodiment of the present invention.
Figure 15:
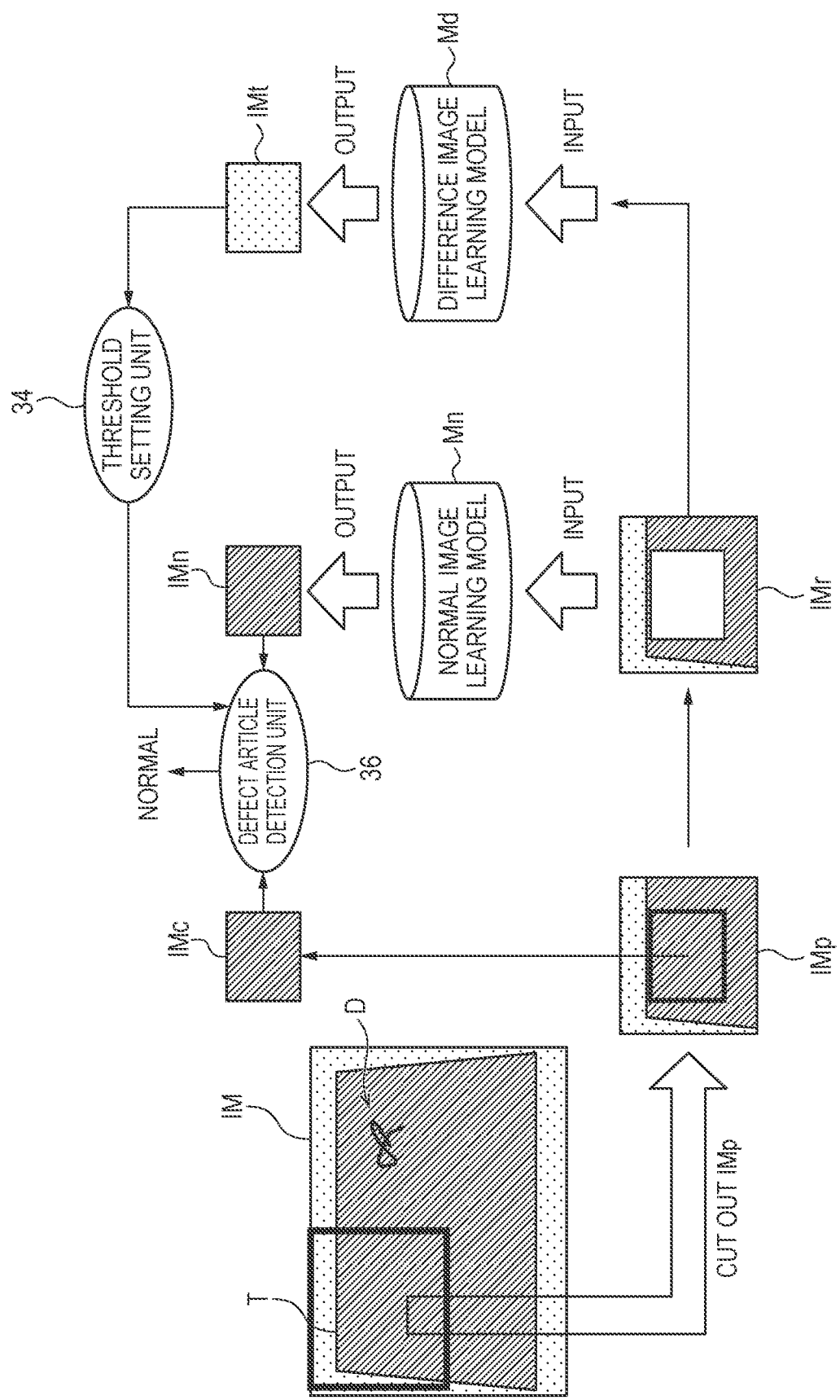
FIG. 15 is a schematic diagram (1) illustrating the defect article detection step in the operation of the image processing apparatus according to one example embodiment of the present invention.
Figure 16:
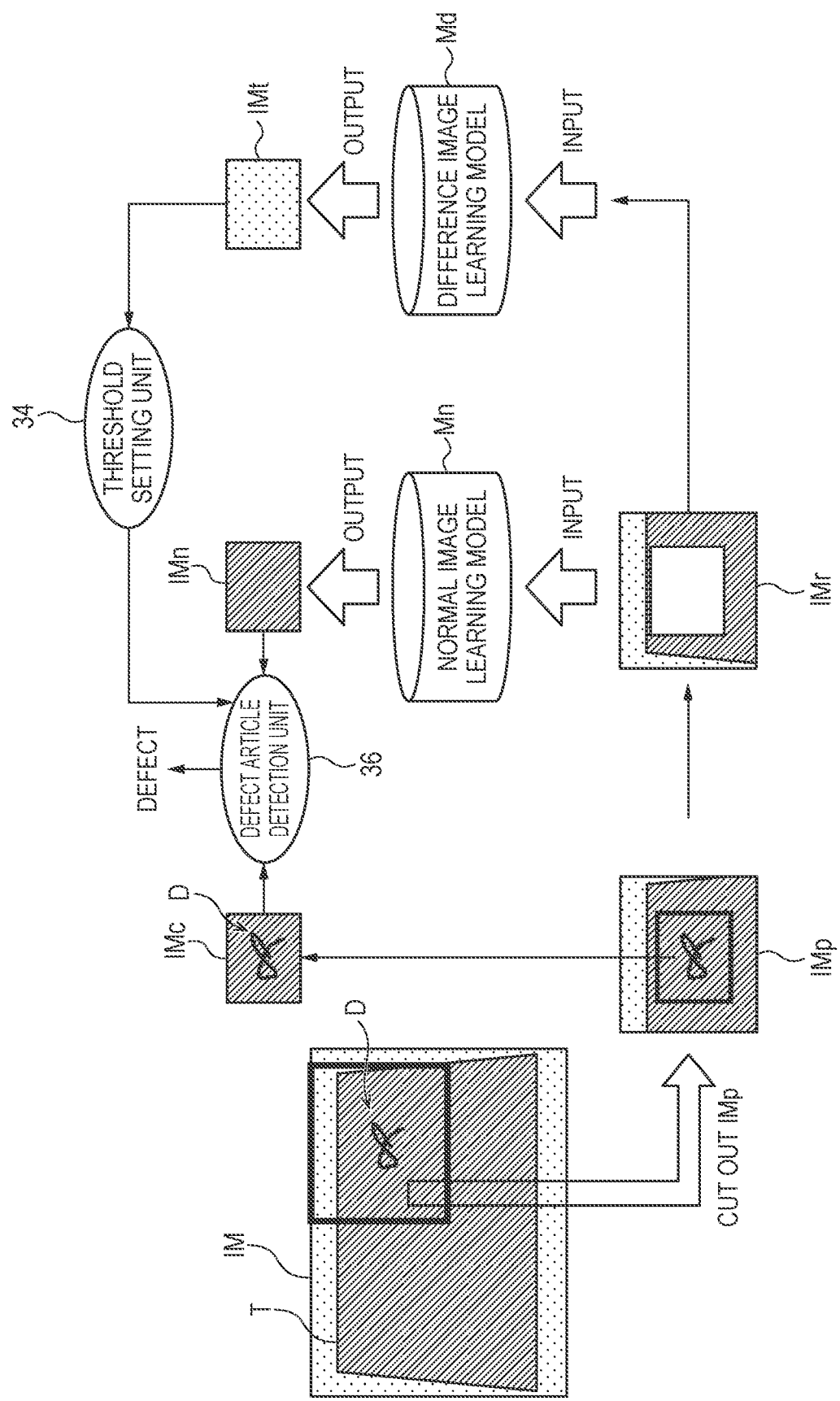
FIG. 16 is a schematic diagram (2) illustrating the defect article detection step in the operation of the image processing apparatus according to one example embodiment of the present invention.

Next, the defect article detection step in the operation of the image processing apparatus 100 according to the present example embodiment will be described with reference to FIG. 14 to FIG. 16. FIG. 14 is a flowchart illustrating the defect article detection step in the operation of the image processing apparatus according to the present example embodiment. FIG. 15 and FIG. 16 are schematic diagrams illustrating the defect article detection step in the operation of the image processing apparatus 100 according to the present example embodiment.

The defect article detection step performed by the defect article detection unit 36 calculates a difference between a center image out of an image pair of a center-removed patch image and a center image created for an inspection image and a normal image generated from the center-removed patch image. Moreover, in the defect article detection step, a defect article, which is abnormal, is distinguished and detected based on the calculated difference.

First, as illustrated in FIG. 14, in step S501, the defect article detection unit 36 reads, as one of the target data, a center image data out of an image pair of a center-removed patch image and a center image created for an inspection image from the patch-processed data storing unit 14. Further, in step S501, the defect article detection unit 36 reads, as the other of the target data, a normal image data created by using a learning model from the center-removed patch image forming an image pair together with the read center image from the generated normal data storing unit 24. The normal image is a center image estimated from a center-removed patch image.

Next, in step S502, the defect article detection unit 36 calculates a difference between two types of center images read in step S501, that is, a difference between the center image and the normal image. Accordingly, the defect article detection unit 36 generates a difference image in which the absolute value of the difference in the pixel value for each pixel between the center image and the normal image is a pixel value for the inspection image.

In such a way, the defect article detection unit 36 and the above difference calculation unit 26 calculate a difference between two types of center images. In such calculation, two types of center images of RGB images or other color images can be used not only for calculation of a difference directly but also for calculation of a difference after performing conversion into another type of images or images defined by another color space and a filtering process, for example. For example, the two types of center images can be used for calculation of a difference after converted into another type of images such as gray scale images or binary images, or images defined by another color space such as HSV or YCbCr. Further, two types of center images can be used for calculation of a difference after a filtering process using a preprocessing filter such as an averaging filter, a median filter, or the like or an edge extraction filter such as a Sobel filter or a Laplacian filter, for example is performed thereon.

On the other hand, in step S503, the difference image generation unit 32 estimates and generates a difference image from the center-removed patch image created for the inspection image. The difference image generation unit 32 uses the difference image learning model trained in the difference image learning step to estimate the difference image.

Next, in step S504, the threshold setting unit 34 sets a threshold used for defect detection in the defect article detection unit 36 based on a difference image generated by the difference image generation unit 32 in step S503. For example, the threshold setting unit 34 sets each pixel value of a difference image as a threshold for each pixel or sets a value obtained by multiplying each pixel value of a difference image by a constant multiplying factor as a threshold for each pixel. In such a way, in the present example embodiment, a threshold used for defect detection is automatically set by the threshold setting unit 34.

Next, in step S505, the defect article detection unit 36 determines on a pixel basis whether or not the difference calculated in step S502 exceeds the threshold set in step S504.

If the defect article detection unit 36 determines that the difference does not exceed the threshold (step S505, NO), the defect article detection unit 36 determines that the pixel of interest is a normal pixel without an anomaly (step S507). On the other hand, if the defect article detection unit 36 determines that the difference exceeds the threshold (step S505, YES), the defect article detection unit 36 determines that the pixel of interest is a defect pixel with an anomaly (step S506). In such a way, the defect article detection unit 36 detects a defect pixel for the center image created from the inspection image.

The defect article detection unit 36 determines, based on the defect pixel detected in such a way, whether or not the center image created from the inspection image is normal. For example, the defect article detection unit 36 can determine whether the center image is normal or defective based on the total number of defect pixels, the area of a region in which defect pixels are continuous, or the number of regions including defect pixels. That is, the defect article detection unit 36 can determine that the center image is defective when the area of a region in which defect pixels are continuous or the number of regions including defect pixels exceeds a predetermined threshold.

FIG. 15 illustrates a view of a case where the center image IMc created from the image IM that is an inspection image is determined as normal. As illustrated in FIG. 15, the defect article detection unit 36 calculates the difference between the center image IMc and the normal image IMn.

The difference image generation unit 32 estimates and generates the difference image IMt that is an estimation image by using the difference image learning model Md from the corresponding center-removed patch image IMr. Furthermore, the threshold setting unit 34 sets a threshold based on the difference image IMt generated by the difference image generation unit 32.

The defect article detection unit 36 determines on a pixel basis whether or not the calculated difference between the center image IMc and the normal image IMn exceeds the threshold set by the threshold setting unit 34 and detects a defect pixel. For example, since the total number of defect pixels does not exceed the threshold as a result of the detection of defect pixels in such a way, the defect article detection unit 36 determines that the center image IMc is normal. In the case illustrated in FIG. 15, the center image IMc includes no defect D and is thus determined to be normal, because the total number of defect pixel does not exceed the threshold, for example.

On the other hand, FIG. 16 illustrates a view of a case where the center image IMc created from the image IM that is an inspection image is determined as defective. As illustrated in FIG. 16, for example, since the total number of defect pixels exceeds the threshold as a result of the detection of defect pixels in the same manner as in the case illustrated in FIG. 15, the defect article detection unit 36 determines that the center image IMc is defective. In the case illustrated in FIG. 16, the center image IMc includes the defect D and is thus determined to be defective, because the total number of defect pixel exceeds the threshold, for example.

Next, in step S508, the defect article detection unit 36 outputs a determination result as to whether a center image created for an inspection image is normal or defective.

The defect article detection unit 36 performs step S501 to step S508 described above on each of the plurality of center images created for an inspection image.

Next, in step S509, the defect article detection unit 36 detects a defect article and outputs a detection result based on the determination result output in step S508. In detection of a defect article, if the number of center images determined to be defective for an inspection image is zero or less than or equal to a predetermined number, the defect article detection unit 36 determines that the inspection target article included in the inspection image is a normal article. On the other hand, if the number of center images determined as defective for the inspection image exceeds the predetermined number, the defect article detection unit 36 determines that the inspection target article included in the inspection image is a defect article.

Accordingly, the defect article detection unit 36 determines the quality of an inspection target article as to whether the inspection target article included in the inspection image is a normal article or a defect article to detect a defect article and outputs the detection result.

As described above, in the present example embodiment, since a normal image learning model that restores a center image from a center-removed patch image is created by using a learning image including a normal article of an inspection target article, an image including a defect article is not required to be collected. Therefore, according to the present example embodiment, since a sufficient amount of learning data can be easily prepared, a learning model can be easily created.

Further, in the present example embodiment, a normal image is estimated and generated from a center-removed patch image in an inspection image to detect a defect article based on the estimated normal image. Thus, according to the present example embodiment, detection of a defect article having high robustness can be realized.

Furthermore, in the present example embodiment, a threshold used for detecting a defect pixel is set by the threshold setting unit 34 based on a difference image generated by the difference image generation unit 32 by using a difference image learning model. Accordingly, in the present example embodiment, even when a variable portion that varies on an individual article basis is included in the image of a normal article, a defect article may be detected at high accuracy.

The image of a normal article may include a variable portion such as a marking, a label, or the like that varies on an individual article basis. Typically, the variable portion may be, for example, an image portion of a marking, a label, or the like that displays a serial number, a lot number, a date, or the like. When such a variable portion is included, it may be difficult to determine whether a difference between an image of an inspection target article and a corresponding normal image generated by the normal image generation unit 22 is a difference due to the variable portion described above or a difference due to a defect supposed to be detected. Thus, when a difference and a fixed threshold are compared to detect a defect, there is likelihood that a defect may be overlooked if the threshold is set to be larger and a variable portion of a normal article may be erroneously detected as a defect if the threshold is set to be smaller.

Figure 17:
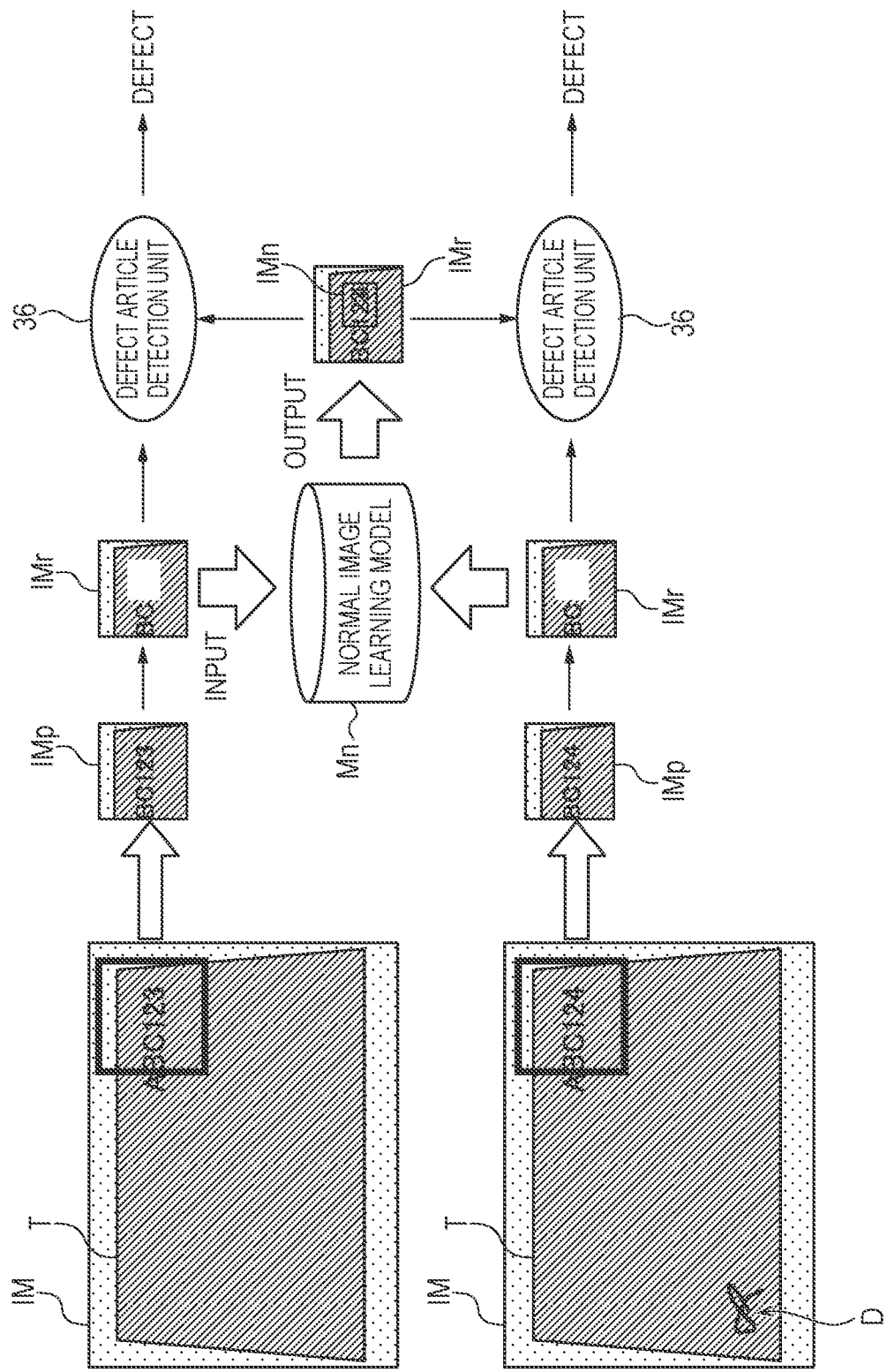
FIG. 17 is a schematic diagram illustrating a case where a threshold is fixed in the defect article detection step in the operation of the image processing apparatus according to one example embodiment of the present invention.

For example, as illustrated in FIG. 17, each image IM including an inspection target article T includes a variable portion that varies on an inspection target article T basis, such as "ABC123", "ABC124", . . . . The normal image IMn output by using the normal image learning model Mn by the normal image generation unit 22 from the center-removed patch images IMr of the patch images IMp including such variable portions will be an average-like image in which the variable portions are averaged. Thus, if the threshold is set to be smaller, there is a likelihood that the variable portion of a normal article may be erroneously detected as a defect. On the other hand, if the threshold is set to be larger, there is a likelihood that a defect is overlooked.

Figure 18:
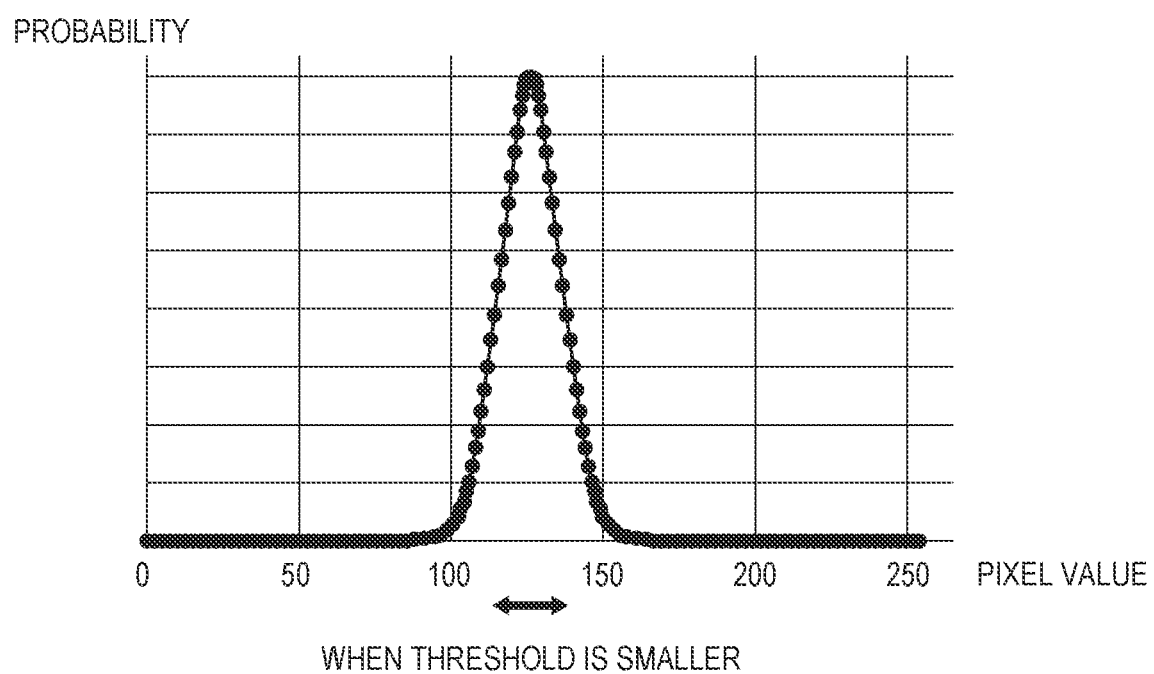
FIG. 18 is a schematic diagram (1) illustrating the relationship between a threshold and a range of values that may be taken by a pixel value of a normal image in the defect article detection step in the operation of the image processing apparatus according to one example embodiment of the present invention.
Figure 19:
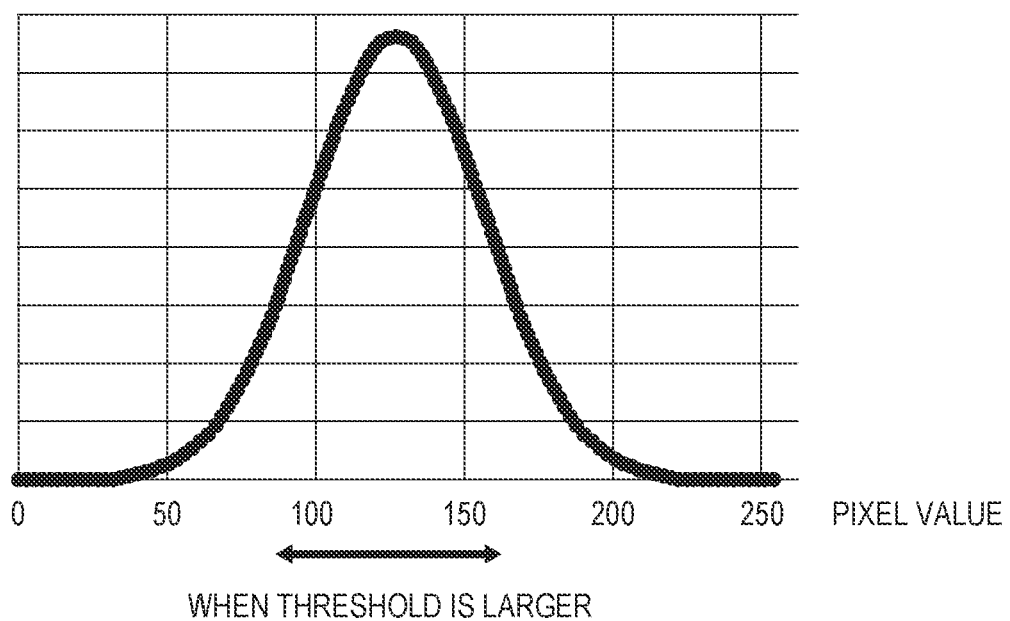
FIG. 19 is a schematic diagram (2) illustrating the relationship between a threshold and a range of values that may be taken by a pixel value of a normal image in the defect article detection step in the operation of the image processing apparatus according to one example embodiment of the present invention.

On the other hand, in the present example embodiment, in learning of the difference image learning model used for setting a threshold, the learning is performed so that a difference that is a reference for a threshold is output in accordance with a range that may be taken by pixel values of a certain pixel in a normal image. FIG. 18 and FIG. 19 illustrate distributions of pixel values of a certain pixel in a normal image, respectively.

In the case illustrated in FIG. 18 where there are few variable portions and the range that may be taken by pixel values of a certain pixel in a normal image is narrow, the difference image learning model is trained so that the difference that is a reference for a threshold is smaller. On the other hand, in the case illustrated in FIG. 19 where there are more variable portions than in the case illustrated in FIG. 18 and the range that may be taken by pixel values of a certain pixel in a normal image is wide, the difference image learning model is trained so that the difference that is a reference for a threshold is larger than in the case illustrated in FIG. 18.

In such a way, in the present example embodiment, since a threshold used for defect detection can be set in accordance with a variable portion in a normal image, a defect can be detected at high accuracy. Further, in the present example embodiment, since such a threshold can be automatically set by the threshold setting unit 34, the labor for manually setting a threshold can be reduced.

As described above, according to the present example embodiment, since an estimation image including at least a predetermined region of an inspection target article is generated as a normal image by using a part of an inspection image including an inspection target article, it is possible to distinguish a defect article, which is abnormal, at high accuracy while reducing influence of an individual difference of images.

Figure 20:
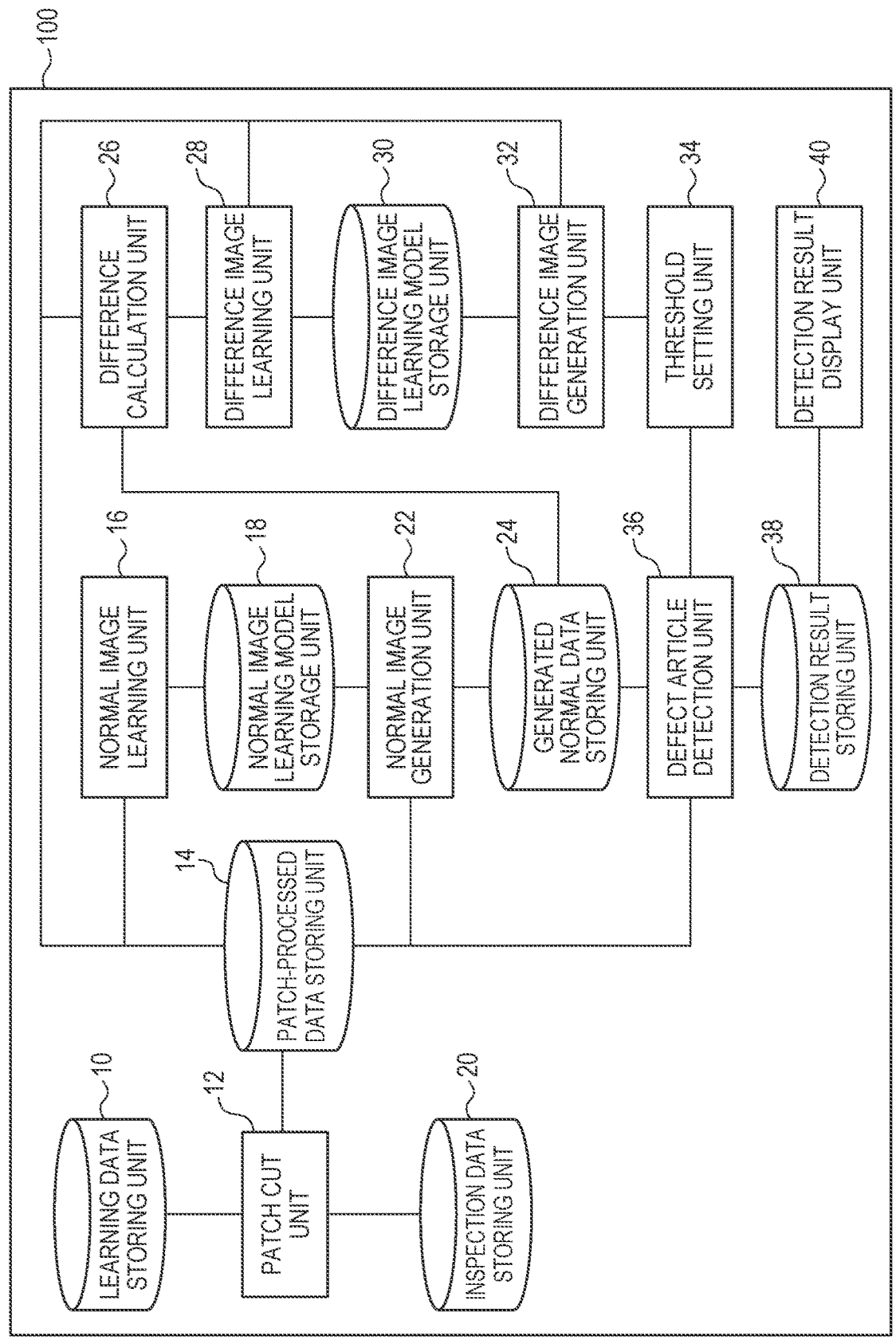
FIG. 20 is a block diagram illustrating a function configuration of an image processing apparatus according to a modified example of one example embodiment of the present invention.

Note that, as illustrated in FIG. 20, the image processing apparatus 100 according to the present example embodiment can also be formed to have a detection result storing unit 38 and a detection result display unit 40. FIG. 20 is a block diagram illustrating a function configuration of an image processing apparatus according to a modified example of the present example embodiment.

In the case illustrated in FIG. 20, the defect article detection unit 36 stores a detection result of a defect article in the detection result storing unit 38. The defect article detection unit 36 can storing, in the detection result storing unit 38, information indicating whether or not an inspection target article is a normal article or a defect article, data of an image indicating a defect position if the inspection target article is a defect article, or the like together with an identifier that identifies an inspection image. Further, the defect article detection unit 36 can also store a detection result of a defect pixel in the detection result storing unit 38.

The detection result storing unit 38 stores a detection result of a defect article or a defect pixel output by the defect article detection unit 36. For example, a database storing a detection result is stored in the detection result storing unit 38. A function of the detection result storing unit 38 is implemented by the HDD 1008 as with the learning data storing unit 10 or the like.

The detection result display unit 40 displays a detection result of a defect article or a defect pixel stored in the detection result storing unit 38. When displaying a detection result, the detection result display unit 40 can display an image representing a defect position by displaying the defect pixel. The detection result display unit 40 is implemented by the output device 1010 as a display device.

Further, in the case illustrated in above FIG. 8, the normal image learning unit 16 trains and creates a learning model that restores a center image IMc of a center region forming a patch image IMp from a center-removed patch image IMr of a frame-shape region forming a patch image IMp. However, the example embodiment is not limited thereto. For example, the normal image learning unit 16 can also train and create a learning model that restores the whole patch image IMp including the center image IMc from the center-removed patch image IMr to generate an estimation image in which the patch image IMp is estimated. In such a case, the normal image generation unit 22 can use such a learning model and generate, as a normal image, an estimation image used for estimating the whole of the patch image IMp in the case of a normal article. Further, the defect article detection unit 36 can compare the whole patch image IMp for an inspection image with an estimation image in which the whole patch image IMp is estimated and detect a defect article.

Other Example Embodiments

Figure 21:
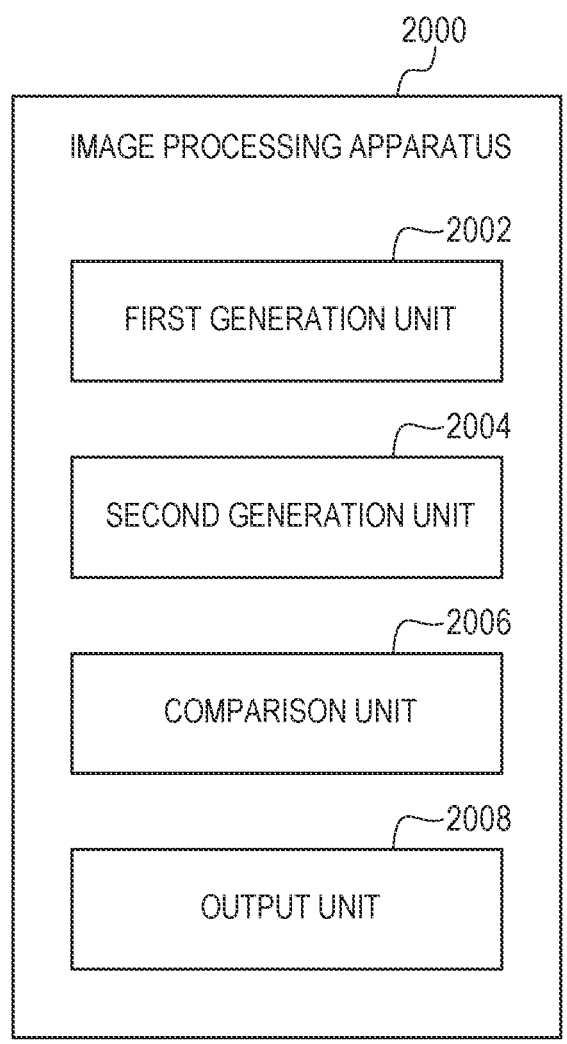
FIG. 21 is a block diagram illustrating a function configuration of an image processing apparatus according to another example embodiment of the present invention.

The image processing apparatus described in each of the above example embodiments can also be formed as illustrated in FIG. 21 according to another example embodiment. FIG. 21 is a block diagram illustrating a function configuration of an image processing apparatus according to another example embodiment As illustrated in FIG. 21, an image processing apparatus 2000 has a first generation unit 2002 that generates a first estimation image including at least a predetermined region of an inspection target by using a part of an inspection image including an inspection target. Further, the image processing apparatus 2000 has a second generation unit 2004 that estimates a difference between the first estimation image and the inspection image to generate a second estimation image by using a part of the inspection image. Further, the image processing apparatus 2000 has a comparison unit 2006 that compares the first estimation image with the inspection image and an output unit 2008 that outputs a comparison result obtained by the comparison unit 2006. The comparison unit 2006 compares the difference between the first estimation image and the inspection image with the second estimation image.

According to the image processing apparatus 2000 according to another example embodiment, since an estimation image including at least a predetermined region of an inspection target is generated by using a part of an inspection image including an inspection target, it is possible to distinguish an anomaly at high accuracy while reducing influence of an individual difference of images.

Figure 22:
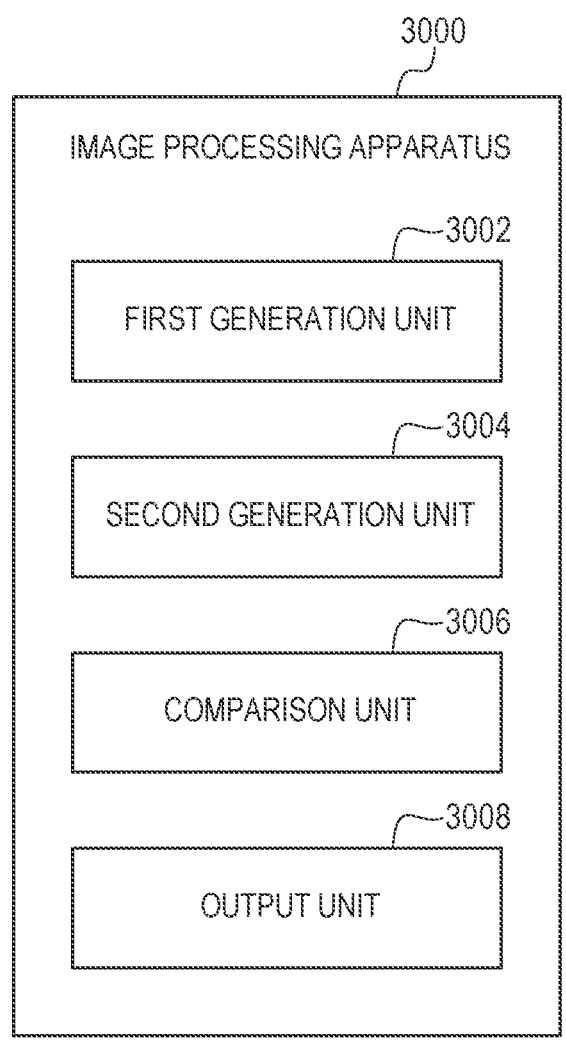
FIG. 22 is a block diagram illustrating a function configuration of an image processing apparatus according to yet another example embodiment of the present invention.

Further, according to yet another example embodiment, the image processing apparatus described in each of the above example embodiments can be formed as illustrated in FIG. 22. FIG. 22 is a block diagram illustrating a function configuration of an image processing apparatus according to yet another example embodiment.

As illustrated in FIG. 22, an image processing apparatus 3000 according to yet another example embodiment has a first generation unit 3002 that generates a second image including at least a predetermined region of an object by using a part of a first image including an object. Further, the image processing apparatus 3000 has a second generation unit 3004 that estimates a difference between the second image and the first image to generate a third image by using a part of the first image. Further, the image processing apparatus 3000 has a comparison unit 3006 that compares the second image with the first image and output unit 3008 that outputs a comparison result obtained by the comparison unit 3006. The comparison unit 3006 compares the difference between the second image and the first image with the third image.

According to the image processing apparatus 3000 according to yet another example embodiment, since a second image including at least a predetermined region of an object is generated by using a part of a first image including an object, it is possible to distinguish an anomaly at high accuracy while reducing influence of an individual difference of images.

Modified Example Embodiments

The present invention is not limited to the example embodiments described above, and various modifications are possible.

For example, while the case of inspection to detect a defect article from an inspection target article has been described as an example in the above example embodiments, the example embodiment is not limited thereto. The present invention can be widely applied to the case of determining whether an object is in a normal state or an abnormal state to detect an abnormal state of the object, that is, a state other than the normal state. The present invention can also be applied to a case of detecting breakage of an object such as a building as an anomaly, a case of detecting an abnormal object, or the like, for example.

Further, the scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

A service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)

An image processing apparatus comprising:
 a first generation unit that generates a first estimation image including at least a predetermined region of an inspection target by using a part of an inspection image including the inspection target;
 a second generation unit that estimates a difference between the first estimation image and the inspection image to generate a second estimation image by using the part of the inspection image;
 a comparison unit that compares the first estimation image with the inspection image; and
 an output unit that outputs a comparison result obtained by the comparison unit,
 wherein the comparison unit compares a difference between the first estimation image and the inspection image with the second estimation image.

(Supplementary Note 2)

The image processing apparatus according to supplementary note 1,
 wherein the inspection image includes a first region and a second region,
 wherein the first generation unit generates the first estimation image of the second region by using an image of the first region in the inspection image,
 wherein the second generation unit estimates a difference between the first estimation image of the second region and the image of the second region in the inspection image to generate the second estimation image by using the image of the first region in the inspection image, and
 wherein the comparison unit compares a difference between the first estimation image of the second region and the image of the second region in the inspection image with the second estimation image.

(Supplementary Note 3)

The image processing apparatus according to supplementary note 2, wherein the first generation unit generates the first estimation image by using a first learning model trained so as to estimate the image of the second region from the image of the first region.

(Supplementary Note 4)

The image processing apparatus according to supplementary note 3, wherein the first learning model is trained by using an image representing a normal state of the inspection target.

(Supplementary Note 5)

The image processing apparatus according to any one of supplementary notes 2 to 4, wherein the second generation unit generates the second estimation image by using a second learning model trained so as to estimate a difference between the first estimation image of the second region and the image of the second region from the image of the first region.

(Supplementary Note 6)

The image processing apparatus according to supplementary note 5, wherein the second learning model is trained by using a difference image between the first estimation image of the second region and an image of the second region for an image representing a normal state of the inspection target including the first region and the second region.

(Supplementary Note 7)

The image processing apparatus according to any one of supplementary notes 1 to 6 further comprising a threshold setting unit that sets a threshold based on the second estimation image generated by the second generation unit, wherein the comparison unit detects a defect in the inspection image by comparing a difference between the first estimation image and the inspection image with the threshold set by the threshold setting unit.

(Supplementary Note 8)

The image processing apparatus according to supplementary note 7, wherein the threshold setting unit sets the threshold on a pixel basis, and wherein the comparison unit detects a defect pixel in the inspection image by comparing a difference between the first estimation image and the inspection image with the threshold on a pixel basis.

(Supplementary Note 9)

The image processing apparatus according to any one of supplementary notes 1 to 8, wherein the first estimation image includes an image representing a normal state of the inspection target in the at least predetermined region.

(Supplementary Note 10)

The image processing apparatus according to any one of supplementary notes 1 to 9 further comprising a determination unit that determines quality of the inspection target based on the comparison result obtained by the comparison unit.

(Supplementary Note 11)

An image processing method comprising:

a first generation step of generating a first estimation image including at least a predetermined region of an inspection target by using a part of an inspection image including the inspection target;

a second generation step of estimating a difference between the first estimation image and the inspection image to generate a second estimation image by using the part of the inspection image;

a comparison step of comparing the first estimation image with the inspection image; and an output step of outputting a comparison result obtained by the comparison step, wherein the comparison step compares a difference between the first estimation image and the inspection image with the second estimation image.

(Supplementary Note 12)

A storage medium storing a program that causes a computer to perform an image processing method comprising:

a first generation step of generating a first estimation image including at least a predetermined region of an inspection target by using a part of an inspection image including the inspection target;

a second generation step of estimating a difference between the first estimation image and the inspection image to generate a second estimation image by using the part of the inspection image;

a comparison step of comparing the first estimation image with the inspection image; and an output step of outputting a comparison result obtained by the comparison step, wherein the comparison step compares a difference between the first estimation image and the inspection image with the second estimation image.

(Supplementary Note 13)

An image processing apparatus comprising:

a first generation unit that generates a second estimation image including at least a predetermined region of an object by using a part of a first image including the object;

a second generation unit that estimates a difference between the second image and the first image to generate a third image by using the part of the first image;

a comparison unit that compares the second image with the first image; and an output unit that outputs a comparison result obtained by the comparison unit, wherein the comparison unit compares a difference between the second image and the first image with the third image.

As described above, while the present invention has been described with reference to the example embodiments, the present invention is not limited to these example embodiments described above. Various modifications that can be appreciated by those skilled in the art can be made to the configuration and details of the present invention within the scope of the present invention.

This application is based upon and claims the benefit of priority from Japanese Patent Application No. 2018-012307, filed on Jan. 29, 2018, the disclosure of which is incorporated herein in its entirety by reference.

REFERENCE SIGNS LIST 10 learning data storing unit
12 patch cut unit
14 patch-processed data storing unit
16 normal image learning unit
18 normal image learning model storage unit
20 inspection data storing unit
22 normal image generation unit
24 generated normal data storing unit
26 difference calculation unit
28 difference image learning unit
30 difference image learning model storage unit
32 difference image generation unit
34 threshold setting unit
36 defect article detection unit
38 detection result storing unit
40 detection result display unit
100 image processing apparatus

What is claimed is:

1. An image processing apparatus comprising:

a processor;

a memory storing executable instructions that, when executed by the processor, causes the processor to perform as:

a first generation unit that generates a first estimation image including at least a predetermined region of an inspection target by using a part of an inspection image including the inspection target;

a second generation unit that estimates a difference between the first estimation image and the inspection image to generate a second estimation image by using the part of the inspection image; and a comparison unit that compares the first estimation image with the inspection image; and an output unit that outputs a comparison result obtained by the comparison unit, wherein the comparison unit compares a difference between the first estimation image and the inspection image with the second estimation image, wherein the inspection image includes a first region and a second region, wherein the first generation unit generates the first estimation image of the second region by using an image of the first region in the inspection image, wherein the second generation unit estimates a difference between the first estimation image of the second region and the image of the second region in the inspection image to generate the second estimation image by using the image of the first region in the inspection image, and wherein the comparison unit compares a difference between the first estimation image of the second region and the image of the second region in the inspection image with the second estimation image.

2. The image processing apparatus according to claim 1, wherein the first generation unit generates the first estimation image by using a first learning model trained so as to estimate the image of the second region from the image of the first region.

3. The image processing apparatus according to claim 2, wherein the first learning model is trained by using an image representing a normal state of the inspection target.

4. The image processing apparatus according to claim 1, wherein the second generation unit generates the second estimation image by using a second learning model trained so as to estimate a difference between the first estimation image of the second region and the image of the second region from the image of the first region.

5. The image processing apparatus according to claim 4, wherein the second learning model is trained by using a difference image between the first estimation image of the second region and an image of the second region for an image representing a normal state of the inspection target including the first region and the second region.

6. The image processing apparatus according to claim 1 further comprising a threshold setting unit that sets a threshold based on the second estimation image generated by the second generation unit, wherein the comparison unit detects a defect in the inspection image by comparing a difference between the first estimation image and the inspection image with the threshold set by the threshold setting unit.

7. The image processing apparatus according to claim 6, wherein the threshold setting unit sets the threshold on a pixel basis, and wherein the comparison unit detects a defect pixel in the inspection image by comparing a difference between the first estimation image and the inspection image with the threshold on a pixel basis.

8. The image processing apparatus according to claim 1, wherein the first estimation image includes an image representing a normal state of the inspection target in the at least predetermined region.

9. The image processing apparatus according to claim 1 further comprising a determination unit that determines quality of the inspection target based on the comparison result obtained by the comparison unit.

10. An image processing method comprising:
generating a first estimation image including at least a predetermined region of an inspection target by using a part of an inspection image including the inspection target;

estimating a difference between the first estimation image and the inspection image to generate a second estimation image by using the part of the inspection image;

comparing the first estimation image with the inspection image; and outputting a comparison result obtained by the comparison, wherein the comparison compares a difference between the first estimation image and the inspection image with the second estimation image, wherein the inspection image includes a first region and a second region, wherein the generating generates the first estimation image of the second region by using an image of the first region in the inspection image, wherein the estimating estimates a difference between the first estimation image of the second region and the image of the second region in the inspection image to generate the second estimation image by using the image of the first region in the inspection image, and wherein the comparison compares a difference between the first estimation image of the second region and the image of the second region in the inspection image with the second estimation image.

11. A non-transitory storage medium storing a program that causes a computer to perform an image processing method comprising:

generating a first estimation image including at least a predetermined region of an inspection target by using a part of an inspection image including the inspection target;

estimating a difference between the first estimation image and the inspection image to generate a second estimation image by using the part of the inspection image;

comparing the first estimation image with the inspection image; and outputting a comparison result obtained by the comparison, wherein the comparison compares a difference between the first estimation image and the inspection image with the second estimation image, wherein the inspection image includes a first region and a second region, wherein the generating generates the first estimation image of the second region by using an image of the first region in the inspection image, wherein the estimating estimates a difference between the first estimation image of the second region and the image of the second region in the inspection image to generate the second estimation image by using the image of the first region in the inspection image, and wherein the comparison compares a difference between the first estimation image of the second region and the image of the second region in the inspection image with the second estimation image.

\* \* \* \* \*